US007110924B2

(12) United States Patent
Prewett et al.

(10) Patent No.: US 7,110,924 B2
(45) Date of Patent: Sep. 19, 2006

(54) METHOD FOR CONTROLLING THE PERFORMANCE OF A TARGET SYSTEM

(75) Inventors: Jeffery L. Prewett, Metamora, IL (US);
Evan E. Jacobson, Peoria, IL (US);
Syamala Srinivasan, Peoria, IL (US);
Stephen W. Bird, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 704 days.

(21) Appl. No.: 10/144,731

(22) Filed: May 15, 2002

(65) Prior Publication Data

US 2003/0217337 A1   Nov. 20, 2003

(51) Int. Cl.
*G06F 17/10* (2006.01)
(52) U.S. Cl. ............................. 703/2; 700/31
(58) Field of Classification Search ................ 703/2, 703/6; 700/29, 31; 701/45
See application file for complete search history.

(56) References Cited

U.S. PATENT DOCUMENTS

| 4,814,991 | A |   | 3/1989  | Tada et al. |
|-----------|---|---|---------|-------------|
| 5,121,467 | A |   | 6/1992  | Skeirik |
| 5,521,814 | A |   | 5/1996  | Teran et al. |
| 5,537,644 | A | * | 7/1996  | Hamilton et al. ............ 706/52 |
| 5,684,946 | A | * | 11/1997 | Ellis et al. .................... 714/33 |
| 5,710,700 | A | * | 1/1998  | Kurtzberg et al. ............ 700/29 |
| 5,790,117 | A |   | 8/1998  | Halviatti et al. |
| 5,857,321 | A |   | 1/1999  | Rajamani et al. |
| 5,901,073 | A | * | 5/1999  | Kurshan et al. ............... 703/6 |
| 5,933,345 | A |   | 8/1999  | Martin et al. |
| 5,987,398 | A | * | 11/1999 | Halverson et al. .......... 702/179 |
| 6,047,221 | A |   | 4/2000  | Piche et al. |
| 6,098,322 | A |   | 8/2000  | Tozawa et al. |
| 6,142,078 | A |   | 11/2000 | Lachajewski |
| 6,151,547 | A |   | 11/2000 | Kumar et al. |
| 6,273,076 | B1|   | 8/2001  | Beck et al. |

OTHER PUBLICATIONS

Steve Schmidt, Phd., Communicating Design of Experiments (DOE) to Non-statisticians, http://www.airacad.com/corndoe.html, Mar. 20, 2002.
Valeria J. Easton et al., "Statistics Glossary: Design of Experiments and ANOVA", http://www.cas.lancs.ac.uk/glossary_v1.1/dexanova.html, Mar. 20, 2002.

(Continued)

*Primary Examiner*—Albert W. Paladini
(74) *Attorney, Agent, or Firm*—Finnegan, Henderson, Farabow Garrett & Dunner, L.L.P.

(57) ABSTRACT

A method and system may be provided to perform a process for controlling a target system. In one aspect of the invention, the process may include determining a design space (D8) including a first set of control data values associated with a set of control variables (X). A model (800) may be generated that reflects a relationship between the first set of control data values and a first set of response data values associated with a set of response variables (Y). Further, the process may test the model (800) to determine whether a set of predicted response data values associated with the set of response variables (Y) meets a predetermined criteria based on a set of actual response data values associated with the set of response variables (Y). The design space (D8) may then be modified to obtain a relationship between a second set of control data values associated with the set of control variables and a second set of response data values associated with the set of response variables, and the second set of control data values may then be applied to the target system.

48 Claims, 12 Drawing Sheets

OTHER PUBLICATIONS

"Design of Experiments", The University of Tennessee Center for Executive Education, http://thecenter.utk.edu/programs/design-experiments-basics-multifactor-experimentation.html., Mar. 20, 2002.

C. F. Kavanaugh & Associates, "Taguchi vs. Classical DOE", http://www.kavanugh.com/doe_taguchi.html, Mar. 20, 2002.

C.F. Kavanaugh & Associates, "What is Design of Experiments?", http://www.kavanugh.com/doewhat.html, Mar. 20, 2002.

* cited by examiner

|  | B2 | B3 | B4 |
|---|---|---|---|
| B1 | | | |
| B5 | B6 | B7 | B8 |
| B9 | B10 | B11 | B12 |

PM1 — C → B1

PM2

PARAMETER 2

PARAMETER 1

*FIG. 12*

METHOD FOR CONTROLLING THE PERFORMANCE OF A TARGET SYSTEM

TECHNICAL FIELD

This invention relates generally to process control systems, and more particularly to systems, methods, and articles of manufacture for controlling the performance of a target system during steady state and transient operations.

BACKGROUND

The increase in the cost of developing systems that operate according to predetermined specifications, such as government standards, has sparked a growth in the design and implementation of process control systems. These control systems typically incorporate process models that may predict, control, and control the performance of the system based on information reflecting the system's historical operations.

A process model may be a mathematical construct that reflects various characteristics of a target system. The model may be used to determine a dependent response variable based on one or more independent control variables. One known type of modeling system implemented in process control systems are neural networks. These types of systems are designed to mimic the operations of the human brain by determining the interaction between input and response variables based on a network of processing cells. The cells, commonly known as neurons, are generally arranged in layers, with each cell receiving inputs from a preceding layer and providing an output to a subsequent layer. The interconnections which transfer the inputs and outputs in a neural network are associated with a weight value that may be adjusted to allow the network to produce a predicted output value.

Neural networks may provide predicted response values based on historical data associated with the modeled system provided as the independent input variables to the network. The weights of the network are adjusted each time the historical data is provided as an input to allow the network to accurately predict the response variables. The predicted outputs are compared to actual response data of the system and weights are adjusted accordingly until a target response value is obtained.

In other traditional process control systems, the relationship between independent control variables and a dependent response variable is determined based on a mathematical function that reflects the relationship. These systems generally attempt to map the relationship using a single mapping function that is selected by a human operator. In most instances, however, a single function fails to accurately represent this relationship. For example, as shown in FIG. 1, a single function F, such as a quadratic function, does not accurately represent the actual relationship F' between an exemplary control variable X and a response variable Y.

To address the inaccuracies associated with single function mapping, conventional process control systems attempt to reduce the range of control variables where the single function appears to accurately depict the relationship between a control and response variable. For example, as show in FIG. 1, the quadratic unction F may be accurate of the X and Y relationship in range R1. Although accurate, these conventional system require a user to define the ranges of the function representing the relationship between the two variables. Further, after a user has defined an appropriate range, another test run must be performed to allow the user to identify the next region in the mapped relationship that indicates a possible accurate relationship.

Although the conventional process of defining ranges and re-testing may eventually allow a relationship between a control and response variable to be mapped to a function, the process is time consuming, requires the input of a user who understands the relationship between the variables, and requires extensive processing and storage space. Also, as the complexity of the relationship increases (e.g., multiple control and response variables), the inefficiencies and inaccuracies of the conventional process control systems described above also increase. For example, there may be some instances where a conventional system may encounter a design space that includes a plurality of response and control variables that requires a three-dimensional, and beyond, mapping construct. Such abstract constructs may be beyond the capabilities of the processing system and/or users involved in mapping the relationships. Therefore, accurate complex mapping functions are unobtainable.

Methods, systems, and articles of manufacture consistent with certain features of the present invention are directed to solving one or more of the problems set forth above.

SUMMARY OF THE INVENTION

In an aspect of the present invention, a process for controlling the performance of a target system is provided. In one aspect of the invention, the process may include determining a design space including a first set of data values associated with a set of control variables. A model may be generated that reflects a relationship between the first set of data values and a first set of response data values associated with a set of response variables. Further, the process may test the model to determine whether a set of predicted response data values associated with the set of response variables meets a predetermined criteria based on a corresponding set of actual response data values associated with the set of response variables. The design space may then be modified to obtain a relationship between a second set of data values associated with the set of control variables and a second set of response data values associated with the set of response variables, and the second set of data values may then be applied to the target system.

In another aspect of the present invention, a system for controlling the performance of a target system is provided. In one aspect of the invention, the system may include a data collection module for determining a design space including a first set of data values corresponding to a set of control variables. Further, the system may include a relationship mapping module for generating a system of models that reflects a relationship between the first set of control data values and a first set of response data values corresponding to a set of response variables. Additionally, the system may include a testing module for testing the model to determine whether a set of predicted response data values associated with the set of response variables meets a predetermined criteria based on a corresponding set of actual response data values associated with the set of response variables. Once tested, the design space may then be modified by a training module to obtain a relationship between a second set of data values corresponding to the set of control variables and a second set of response data values corresponding to the set of response variables. Subsequently, the system may apply the second set of data values to the target system.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings:

FIG. 12 illustrates an exemplary parameter map consistent with certain principles related to the present invention.

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Figure 1:
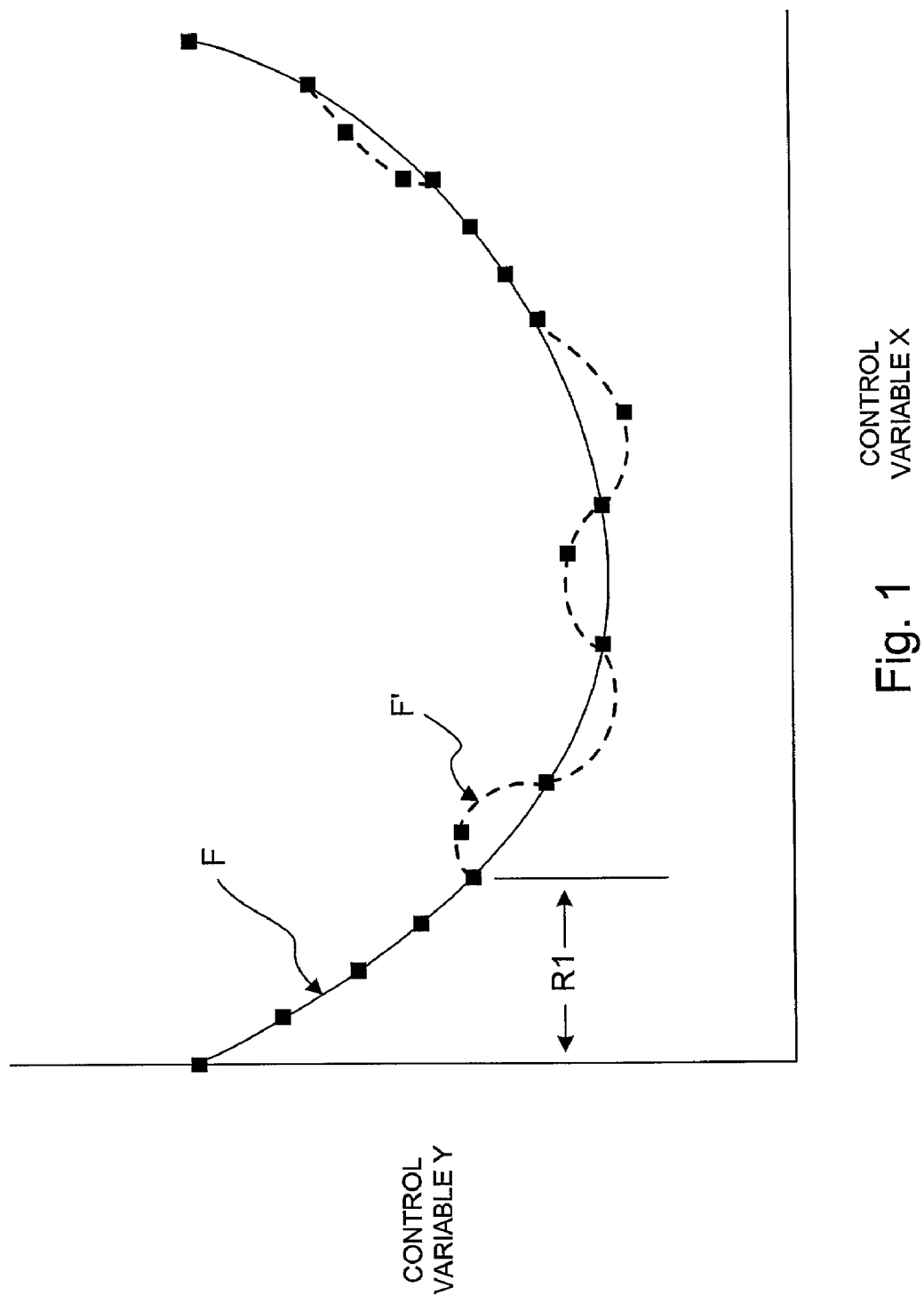
FIG. 1 illustrates a diagram of a mapped relationship between an exemplary control and response variable.
Figure 2:
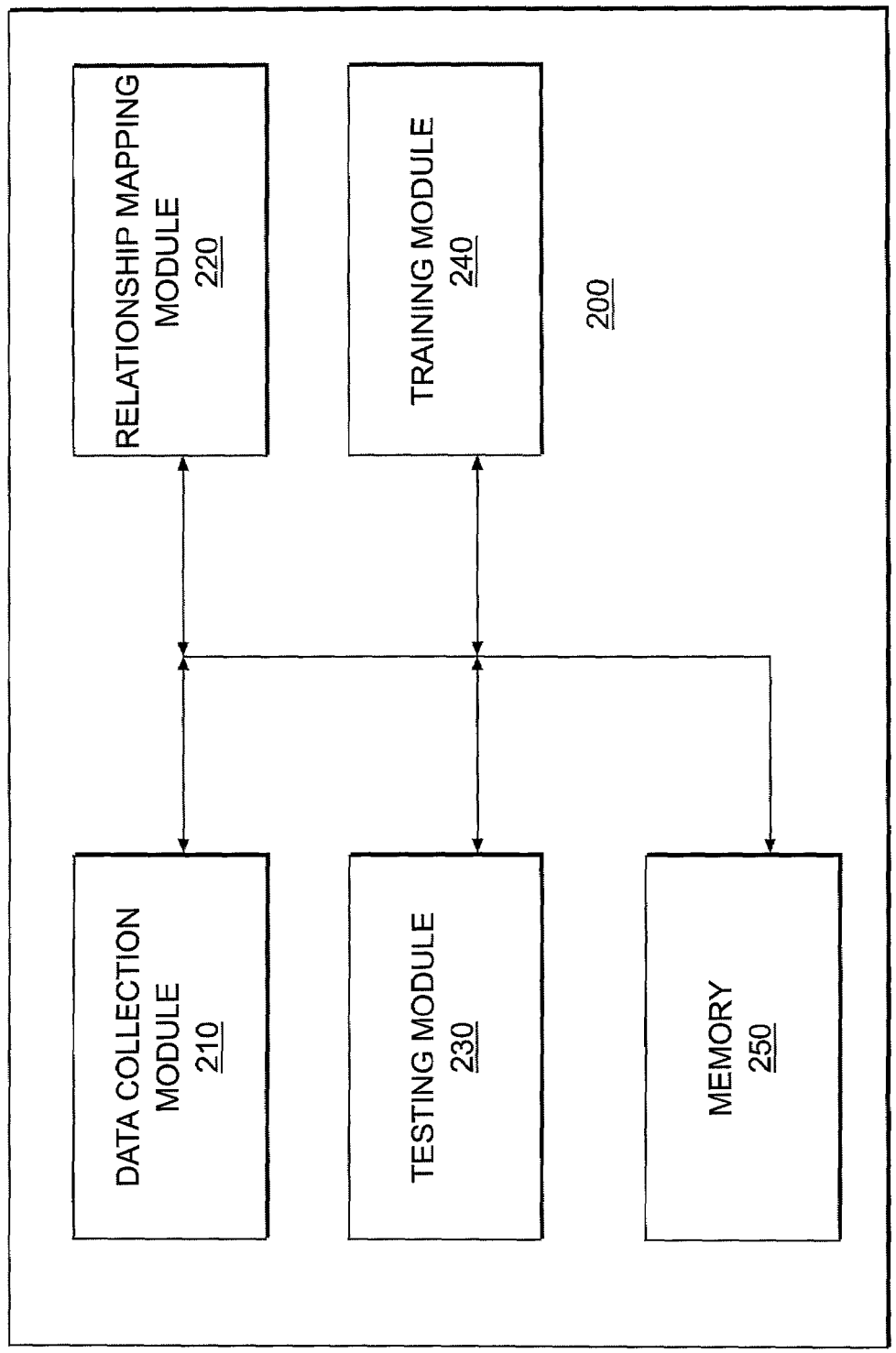
FIG. 2 illustrates an exemplary system that may be configured to perform certain functions consistent with principles related to the present invention.

FIG. 2 illustrates an exemplary system 200 in which features and principles consistent with the present invention may be implemented. In one aspect of the invention, the exemplary system 200 may be a processing system that is associated with a testing facility that controls off-line operations, such as off-line testing, of target systems. One skilled in the art would realize that off-line testing may refer to testing that is performed on a system that is not operating in the field, but rather operating during various stages of testing, design, or development. Further, off-line operations may refer to operations where the target system is not performing its functions in a work environment based on actual work conditions, but rather performing its functions based on test data (e.g., input or constraint values) that has been defined outside of normal operating conditions.

Alternatively, system 200 may be associated with a processing system that is operating on-line. On-line operations may be associated with operations of a system in a work environment in which the system was designed to operate. For example, system 200 may be implemented in an engine control unit that monitors and controls various operations of an engine. Therefore, during operations of the engine, system 200 may perform functions consistent with certain features related to the present invention. Alternatively, system 200 may be implemented within a control unit associated with a factory assembly line that produces pieces of equipment. Further, system 200 may be implemented in a water-based, land-based, or air-based vehicle or system that may perform any number of different operating functions. The present invention is applicable where there is a desire to establish a relationship between a system's control variables and response variables, such that the system may be controlled in a desirable manner in future operations.

One skilled in the art would realize that system 200 may be implemented in different environments associated with any type of technology, process, industry, operating conditions, and/or operating environments without departing from the spirit and scope of the present invention.

As shown in FIG. 2, system 200 may include a plurality of modules that perform various functions consistent with certain features related to the present invention. In one aspect of the present invention, system 200 may include a data collection module 210, a relationship mapping module 220, a testing module 230, a training module 240, and a memory module 250. One skilled in the art would realize that modules 210–240 may be individual processing modules that may include software, hardware, or a combination of both. For example, modules 210–240 may each include at least one processor and associated support elements (e.g., memory device(s), input/output devices, communication devices, etc.) that are configured to perform each module's certain functions consistent with certain features related to the present invention. Alternatively, modules 210–240 may reflect instructions that are stored in a memory device and perform certain functions when executed by one or more processors operating within system 200. One skilled in the art would realize that modules 210–240 may be a combination of software and/or hardware that allows system 200 to perform functions consistent with certain aspects related to the present invention.

Memory 250 may be any type of memory device known in the art that stores data that may be used and processed by modules 210–240 and any other element associated with system 200. For example, system 200 may include one or more processors (not shown) that access information from and/or store information in memory 250 to perform certain functions related to the present invention.

Although FIG. 2 shows the configuration of modules 210–250 as separate entities, one skilled in the art would realize that system 200 may be implemented in a number of different configurations without departing from the scope of the present invention. For example, modules 210–250 may be combined into a single module that includes software, hardware, and/or a combination of both, that perform processes consistent with certain features related to the present invention. Alternatively, system 200 may be configured as a distributed system, with modules 210–250 distributed in remote locations and interconnected by communication paths, such as Local Area Networks (LANs), Wide Area Networks (WANs) and any other type of network that may facilitate communications and the exchange of information between modules 210–250 and/or any other elements that may be implemented by system 200. Also, system 200 may include additional or fewer modules than those depicted in FIG. 2 without departing from the scope of the present invention.

In one aspect of the present invention, data collection module 210 may be a process that determines control variables, response variables, constraints, and design spaces based on a target system and/or process that system 200 is configured to monitor and control. The term "target system" may reflect a system and/or process that system 200 may be configured to monitor and control the performance thereof. Data collection module 210 may perform its functions with or without human intervention. For example, a user may provide certain control variables, ranges of values and constraints that system 200 is to consider when controlling the performance of a target system. Alternatively, data collection module 210 may include processes that autonomously determines variables, constraints, design space characteristics, etc., based on the characteristics of the target system. Further, data collection module 210 may provide control variables to the target system and collect actual response variables based on the operation of the target system.

Relationship mapping module 220 may be a process that receives and/or retrieves the information managed and collected by data collection module 210 to determine a system of models reflecting relationships between control and response variables. Relationship mapping module 220 may include various types of mathematical-based constructs to perform certain features related to the present invention. Further, relationship mapping module 220 may provide relationship data (e.g., a mathematical model or function) in various forms, such as tables, graphical representations, data arrays, etc. Also, the information provided by relationship mapping module 220 may be provided to other modules included in system 200 or to a user through a display interface and/or printer devices. One skilled in the art would realize that the configuration and techniques used to provide relationship data from relationship mapping module 220 may vary without departing from the scope of the present invention.

Testing module 230 may be a process that applies control variables to a model generated by relationship mapping module 220. Additionally, or alternatively, testing module 230 may also apply the test control variables to the target system and may collect the response variables obtained from the target system. Alternatively, the response variables obtained from either the system of models or actual target system may be collected by data collection module 210. Testing module 230 may also include processes performed by one or more processors that determine whether a model of the target system is performing at, or showing a tendency to perform at, a desired or enhanced level based on selected response variables. In one embodiment, the desired or enhanced level may be an optimum level. Further, the results of these determinations may be provided to training module 240.

Training module 240 may be a process that adjusts the model determined by relationship mapping module 220 to locate an enhanced operating condition for the target system. In one aspect of the invention, training module 240 may determine appropriate control variables that should be applied to the target system to receive predetermined response variable values from the target system and/or model. Training module 240 may include software that, when performed by a processor, determines whether enhanced levels of response variables may be obtained based on previous adjustments to either the model or the control variables. Various mathematical constructs may be implemented by training module 240 to perform certain functions related to the present invention. For example, training module 240 may include a neural network process, that when executed, determines adjustments to the model generated by relationship mapping module 220 based on data provided by testing module 230. Further, the neural network may receive input data from other sources, such as various sensors operating within the target system that monitor various operating conditions associated with the target system. These sensors may be virtual or actual sensors that provide the input data.

Alternatively, training module may include other mathematical constructs such as predefined algorithms in the form of software instructions that, when executed by a process, perform a control process that converges a control and response variable relationship to an enhanced or desired target value. One skilled in the art would realize that training module 240 is not limited to the above exemplary mathematical constructs and/or processes to perform certain functions related to the present invention. A number of different types of algorithms, processes, constructs, and scripts may be implemented by training module 240 without departing from the scope of the present invention.

Memory 250 may be any type of storage device that stores information. Modules 210–240, as well as other elements (not shown) operating within system 200, may access memory 250 to receive and/or store information therein. Memory 250 may be a semiconductor, optical, or magnetic-based storage device. Further memory 250 may be a volatile or non-volatile memory device and may be a single or multiple storage devices (e.g., array). One skilled in the art would realize that the type of storage device implemented by memory module 250 may vary without departing from the spirit and scope of the present invention.

Figure 3:
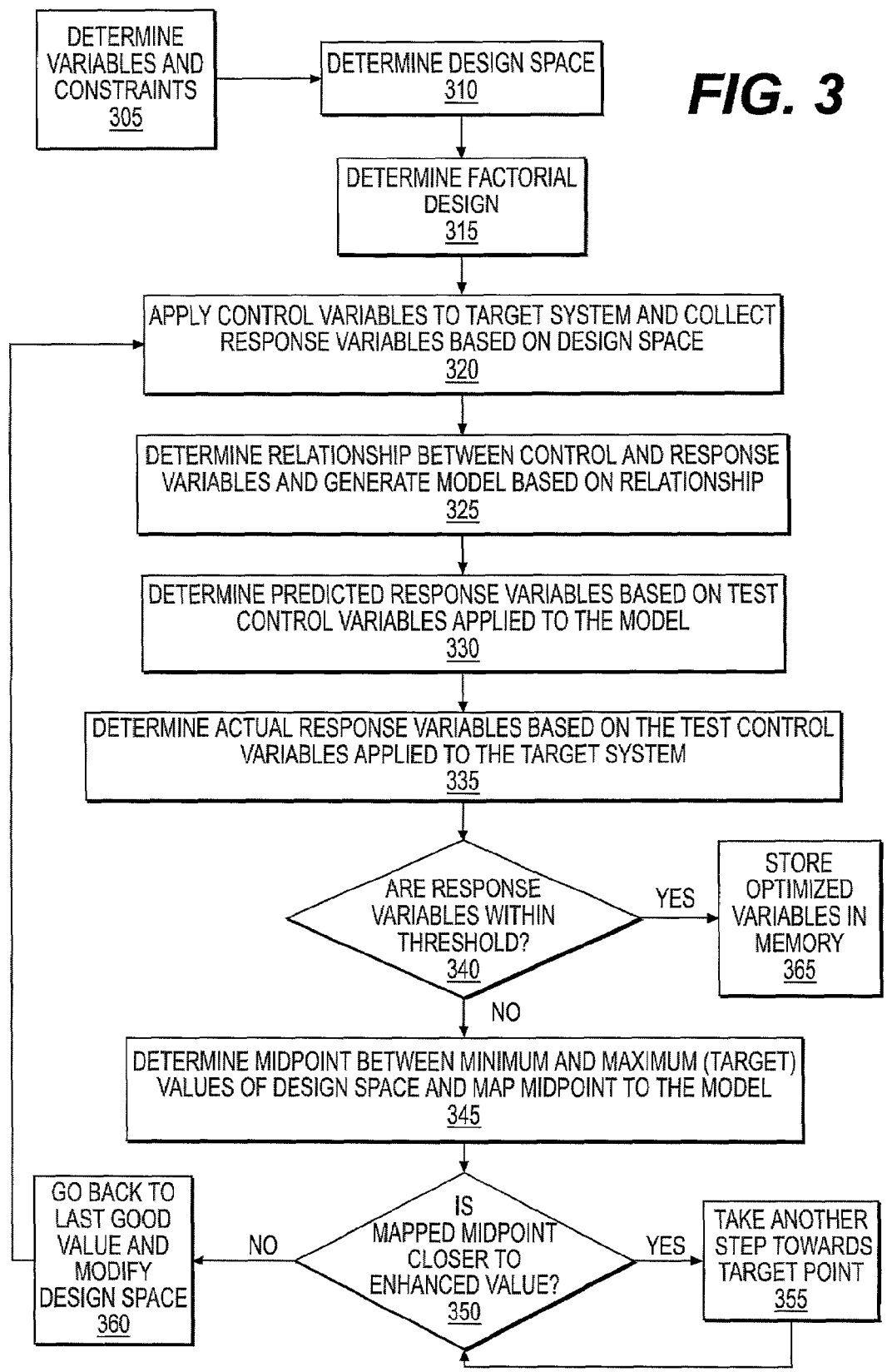
FIG. 3 illustrates a flowchart of an exemplary control process consistent with certain principles related to the present invention.

In one aspect of the invention, exemplary system 200 may be configured to determine appropriate operating characteristics of a target system to allow enhanced response variables to be achieved. FIG. 3 shows a flowchart of an exemplary control process that may be performed by system 200 that is consistent with certain features related to the present invention. As shown, the control process may begin with the determination of variables and constraints that are associated with the type of target system that system 200 is associated (Step 305). The variables may include control variables and response variables. Control variables may be variables that are independent or dependent in the sense the variables are derived from or by another system, and control the target system. Response variables may be dependent variables and are associated with various response characteristics of the target system. Response variables may or may not change based on the control variables applied to the target system. For example, based on a control variable X1 that is applied to a target system, data collection module 210 may monitor a predetermined response variable Y1. Thus, based on an adjustment to control variable X1, response variable Y1 may or may not change values.

In addition to control and response variables, system 200 may determine constraints as well. Constraints may be conditions that may be associated with a control variable, response variable, and/or a combination of control and/or response variables. For example, a constraint associated with a control variable X1 may specify that X1 cannot exceed or fall below a predetermined value. Alternatively, or additionally, a constraint may be associated with a response variable Y1 that is dependent upon a constrained control variable. For instance, a constraint may be defined that specifies that dependent variable Y1 may not exceed or fall below a predetermined value while control variable X1 is operating within a constrained range of values. Accordingly, in one aspect of the invention, data collection module 210 may define a set of limits for each control variable and response variable. These limits may be based on operating conditions of the target system wherein if exceeded (or not reached), the target system may experience some failure or perform at a less than desired performance level. Alternatively, the limits may be associated with regulatory values set by government standards for the type of target system that is being controlled by system 200. For exemplary purposes, certain aspects of the present invention will be described based on two control variables X1 and X2 and two response variables Y1 and Y2. One skilled in the art would realize that system 200 may define any number of control and response variables with a number of different constraint variables without departing from the scope of the present invention.

In accordance with certain aspects related to the present invention, a response variable need not be constrained to particular values, but rather may be defined as a function of another variable. For example, response variable Y2 may be defined as having a maximum value based on a function of control variable X1, such as Y2 (Max)=n(X1), where n may be an integer. Further, control variables may also have constraints that are defined as a function of other variables. Also, a control or response variable does not have to have a constraint associated with it, while other variables may have constraints. One skilled in the art would realize that any combination of constraints associated with the variables determined by data collection module 210 may be implemented without departing from the scope of the present invention.

Further, data collection module 210 may determine enhanced values that the defined response variables should obtain to meet predetermined operating goals associated with the target system. The operating goals may be determined autonomously by system 200 based on historical operating data and expert system information that may be associated with the target system. Alternatively, the operating goals may be provided by a user based on desired operating characteristics associated with the target system. For example, system 200 may be configured to define a range of values in which a particular response variable should be confined to meet certain regulations or design limits associated with the target system.

In one embodiment, a control variable may be associated with a fixed data value or a range of values that includes a dead band, which is a value, or sub-range of values, within the control variable's range of values that the target system is not allowed to operate. For example, a control variable may be associated with a range of values from 0 to 10. This range for the exemplary control variable may also include a dead band including the values from 0 to 4. Therefore, the target system may not be designed to operate when a value of the control variable is determined to be within the dead band (e.g., 0–4). Accordingly, the present invention may designate any determined control variable value between 0 to 4 as a "0. " In the above example, a value for the exemplary control variable may be determined from the range including 0 and 5–10. Further, the dead band for a control variable may encompass a portion of, or the entire range of, values for the control variable. For example, in the range of values for the above exemplary control variable, the dead band may include the entire range from 0 to 10. In this instance, the present invention may determine that the value of the control variable may be either 0 or 10.

Referring to FIG. 3, once the variables and constraints are determined, system 200 may determine a design space that may be used during operations, at least portions of which will be tested (Step 310). The design space may include a range of values that each control variable may be tested during the control process. The range of values may include a minimum and maximum value that is associated with each control variable. The minimum and maximum values may or may not be equivalent to the constraint values determined in Step 305. In one aspect of the present invention, the design space bounded by the range values, may be determined by a human operator or autonomously by data collection module 210 based on the characteristics of the target system. For exemplary purposes, Table 1 shows exemplary minimum and maximum values that define a design space associated with control variables X1 and X2.

TABLE 1

| Exemplary Control Variables | | |
| --- | --- | --- |
| | Minimum | Maximum |
| Control Variable X1 | 10 | 100 |
| Control Variable X2 | 100 | 200 |

Figure 4:
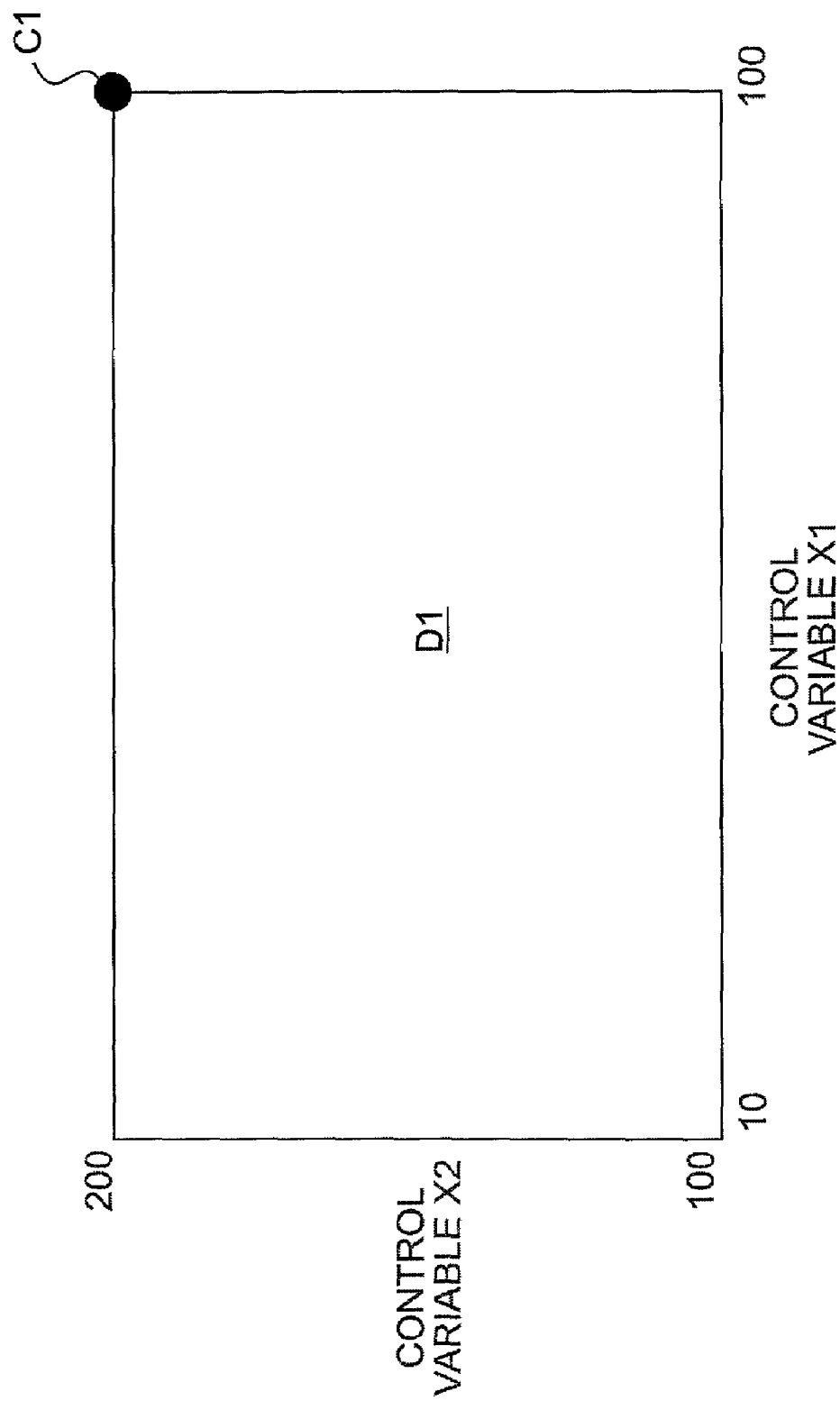
FIG. 4 illustrates an exemplary design space consistent with certain principles related to the present invention.

Accordingly, the exemplary design space for control variables X1 and X2 may be a space confined by the limits associated with the minimum and maximum values of X1 and X2, respectively. FIG. 4 shows a diagram of an exemplary design space D1 associated with control variables X1 and X2. Each corner point of design space D1 may represent the extreme values of the design space. Further each point included in design space D1 may represent the response variables associated with the control variables X1 and X2. For example, corner point C1 may reflect the two exemplary response variables Y1 and Y2 associated with exemplary control variables X1 and X2. One skilled in the art would realize that if there were additional response variables associated with control variables X1 and X2, they would also be reflected in each point included in design space D1.

Although FIG. 4 shows a 2-dimensional design space based on the two control variables X1 and X2, certain aspects of the present invention allow for additional representations based on more than two control variables. For example, if three control variables X1, X2, and X3 were determined by data collection module 210, the design space may be a 3-dimensional design space. Accordingly, the control process consistent with certain features related to the present invention may allow system 200 to evaluate the characteristics of one or more response variables based on one or more control variables. Accordingly, system 200 may adjust one or more control variables and collect values of defined response variables based on the adjusted control variable(s). In one embodiment, system 200 may be configured to determine a factorial design for the variables and design space determined in Steps 305 and 310 (Step 315). A factorial design is a mathematical construct that allows system 200 to evaluate two or more control variables simultaneously. For example, a non-factorial design approach may be to adjust one control variable at a time, such as X1, and monitor the values of a target system's defined response variables based on the adjustment. Thus, in the exemplary design space depicted in FIG. 4, the response variables Y1 and Y2 may be monitored based on the adjustment for X1, but would neglect any adjustments for control variable X2. With a factorial design, adjustments may be made to both X1 and X2 to monitor the response variables Y1 and Y2. Although the control process described herein shows the use of factorial designs, the present invention provides for both factorial and non-factorial designs.

Further, factorial designs may also allow system 200 to control the type of interactions between control variables that are being tested. For example, suppose that in addition to control variables X1 and X2 as shown in Table 1, system 200 defined a third control variable X3 with a design space range of X3(Min)=20 to X3(Max)=2(X1). As can be seen, in this exemplary design space, there may be a problem with applying the maximum value of X3 when X1 is applied at its minimum value of 10 because the value of X3 would not change. In other words, there would be no actual range of values associated with X3 when X1 is applied at the minimum value of 10 because of the function 2(X1). As can be seen, when X1=10, X3(Max)=20, which is identical to X3(Min). Therefore, system 200 may want to avoid testing this condition to save processing time. An appropriate selected factorial design may allow system 200 to avoid a test that includes X1(Min) and X3(Max).

Figure 5:
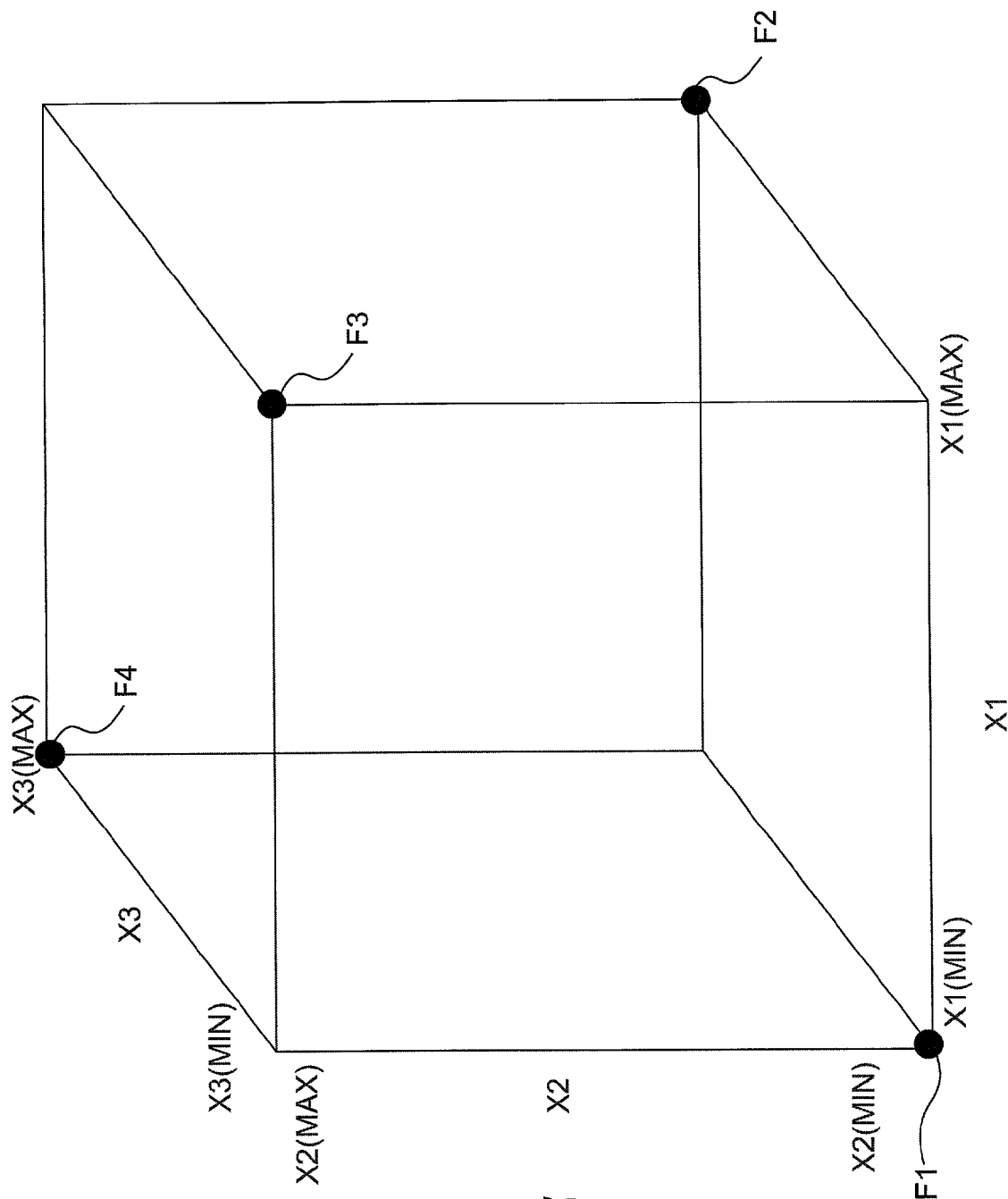
FIG. 5 illustrates an exemplary factorial design space consistent with certain principles related to the present invention.

In one aspect of the present invention, certain criteria may control what type of factorial may be selected by system 200, including compensations for processing time and data storage. Accordingly, system 200 may select a half factorial design instead of a full factorial design to reduce the amount of data interactions that may be tested. For example, a design space that includes three control variables X1, X2, and X3 may include a full factorial data set of eight points, one for each corner of the factorial design space. FIG. 5 shows an exemplary full factorial design space associated with the three control variables X1–X3. A half factorial design may only consider four data points, such as data points F1 through F4, as shown in FIG. 5. One skilled in the art would recognize that system 200 may implement any number of different types of factorial designs based on the characteristics of not only the target system, but also system 200. For example, the processing power, storage capabilities, etc. of system 200 may influence the type of factorial design used by the control process. Further, methods, systems, and articles of manufacture consistent with certain features related to the present invention are not limited to factorial designs. That is, a number of different mathematical constructs may be implemented by system 200 to facilitate the determination of an interaction between control variables and response variables without departing from the spirit and scope of the present invention.

Figure 6:
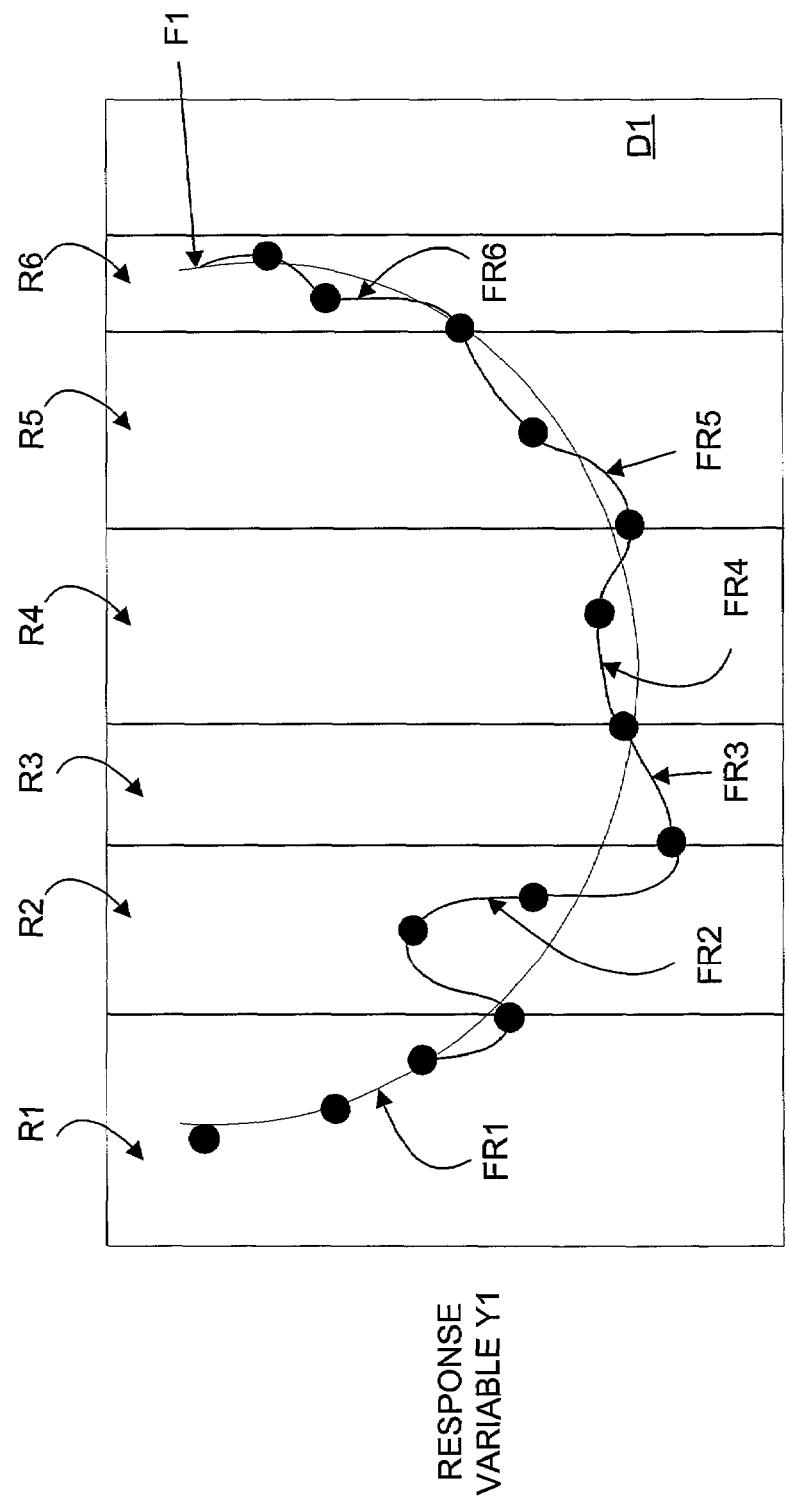
FIG. 6 illustrates an exemplary model reflecting a relationship between control and response variables consistent with certain principles related to the present invention.

Once a factorial design has been determined, system 200 may apply the determined control data values associated with the control variables to the target system and collect response data values associated with the response variables based on the design space determined in Step 310 (Step 320). In one aspect of the invention, data collection module 210 may be employed by system 200 to apply the control variables (e.g., control data values for the control variables) to the target system and collect the response variables (e.g., response data values corresponding to the response variables). Alternatively, system 200 may employ other modules, such as testing module 230, to apply the control variables to the target system without departing from the spirit and scope of the present invention. For example, system 200 may apply control variables X1 and X2 to the target system and collect values associated with response variable Y1. In one aspect of the invention, system 200 may apply various values of control variables X1 and X2 within the predetermined range of values defined by the determined design space. One skilled in the art would recognize, however, that based on the number of different control and response variables, the number of data points associated with the various response variables collected in the design space may be much larger than the exemplary data points associated with variables X1, X2, and Y1. For exemplary purposes, FIG. 6 shows a plot of points in design space D1 that may reflect the relationship between an exemplary control variables X1 and X2, and response variable Y1. Design space D1 shown in FIG. 6 may represent a two-dimensional "slice" of a three-dimensional design space that includes the relationships between the control variables X1 and X2, and the response variable Y1. For instance, the three-dimensional design space (not shown) may be represented by a graph including control variables X1 and X2 that reflect an X-axis and Z-axis, respectively, while control variable Y1 reflects the Y-axis. Accordingly, FIG. 6 represents a two-dimensional portion of the three-dimensional design space that includes the Y-axis and the X-axis.

In one aspect of the invention, once system 200 has collected the appropriate response variables based on the various applications of control variables X1 and X2, relationship mapping module 220 may generate a model that reflects the relationship between these variables (Step 325). That is, mapping module 220 may generate a model reflecting a relationship between the control variables and the response variables associated with the determined design space. For example, the model may reflect relationships between a set of control data values associated with the control variables and a set of corresponding response data values associated with the response variables. In one aspect of the present invention, the model may reflect a plurality of functions that represent a continuous relationship between the control and response variables. For example, as shown in FIG. 6, the exemplary data points in design space D1 may not be adequately represented by a single function F1. Accordingly, system 200 may segment the data points into different regions and determine the appropriate function that represents the data in each region. Collectively, the functions for each region may adequately represent a relationship between the control variables and response variables associated with the target system. For instance, as shown in FIG. 6, system 200 may segment design space D1 into six regions R1–R6. Each region may be represented by a respective function that relationship mapping module 220 may determine.

In one aspect of the present invention, relationship mapping module 220 may determine a function for each region of a design space through iterative computation processes. For instance, module 220 may attempt to reconcile a series of data points in design space D1 with a default function, such as a linear or quadratic function. Once module 220 determines that the default function does not appear to adequately represent the relationship associated with the data points in design space D1, another function may be attempted, and so forth until each region in design space D1 is adequately represented by a function. In one aspect of the present invention, module 220 may use historical data associated with the target system and previous relationships with similar control and response variables to select a default function for each region. In this manner, system 200 may save processing time by initially bypassing functions that have historically been proven not to be an adequate representation of the variable relationships. For example, system 200 may recognize that a linear relationship between control and response variables may not be the most efficient starting function based on historical data associated with the target system. One skilled in the art would recognize that system 200 is not limited to the above exemplary processes and that a variety of different processes and iteration computations that determine an appropriate function to represent a series of data points in a design space may be implemented without departing from the scope of the present invention.

To better describe certain aspects related to the relationship mapping features of the present invention, refer to the exemplary design space D1 shown in FIG. 6. Based on the data points in design space D1, system 200 may determine that the function in range R1 is adequately represented by a quadratic function. Accordingly, an appropriate quadratic function FR1 may be determined that represents the relationship within range R1. System 200 may follow a similar process to determine an appropriate function for each range in design space D1, which are represented in FIG. 6 as functions FR2–FR6. Based on the combination of functions FR1–FR6, system 200 may then generate models that reflect the relationship between control variables X1 and X2 and response variable Y1. Thus, system 200 may also allow the models to be used in segments based on a value of a control variable or variables. For example, function FR1 may be used by system 200 when control variables X1 and X2 are set at values within range R1.

Once relationship mapping module 220 generates a system of models, system 200 may test the relationships reflected in the models for their accuracy. In one aspect of the present invention, testing module 230 may apply test control variables to the models to produce predicted response variables (Step 330). The test control variables may be associated with the same control variables determined by data collection module 210. One skilled in the art would realize that the types and values of the test control variables applied by testing module 230 may vary without departing from the scope of the present invention. In one aspect of the invention, testing module 230 may obtain the predicted response variables by providing the test control variables to relationship mapping module 220 for application to the generated models. Module 220 may then apply the test control variables to the models, which may produce predicted response variables based on the relationships reflected in the models. Alternatively, testing module 230 may receive the models from module 220 and obtain the predicted response variables from the models based on the application of test control variables to the models. The predicted response variables may be stored in memory 250 or a memory device associated with any of the modules in system 200, such as testing module 230.

The control process consistent with certain features related to the present invention may also apply the test control variables to the target system to obtain actual response variables from the target system (Step 335). In one aspect of the present invention, testing module 230 may provide the test control variables to data collection module 210 for their application to the target system. Alternatively, testing module 230 may apply the test control variables to the target system without the aid of other modules in system 200. One skilled in the art would realize the test control variables may be applied to the target system using different techniques and modules in system 200 without departing from the scope of the present invention. Further, the actual response variables obtained from the target system may be stored in memory 250 or any other memory device associated with any module in system 200.

Once the actual and predicted response variables are collected, system 200 may allow training module 240 to determine whether the predicted response variables are within an acceptable threshold with respect to the actual response variables (Step 340), and if so, perform a training process consistent with certain features related to the present invention. In one aspect consistent with certain features related to the present invention, testing module 230 may be configured to define a desired response region within design space D1. Testing module 230 may then test the relationships between the determined control variables and response variables within the defined response region. When the actual response variables fall within the desired region and the predicted response variables do not, training module 240 may perform training processes consistent with certain features related to the present invention (discussed below). On the other hand, when the actual response fall outside the defined region, system 200 may prevent training module 240 from performing any training processes. In this aspect of the invention, system 200 may fine tune the accuracy of the relationships to the desired response region and avoid areas that are deemed not important to the testing of the target system.

Figure 7:
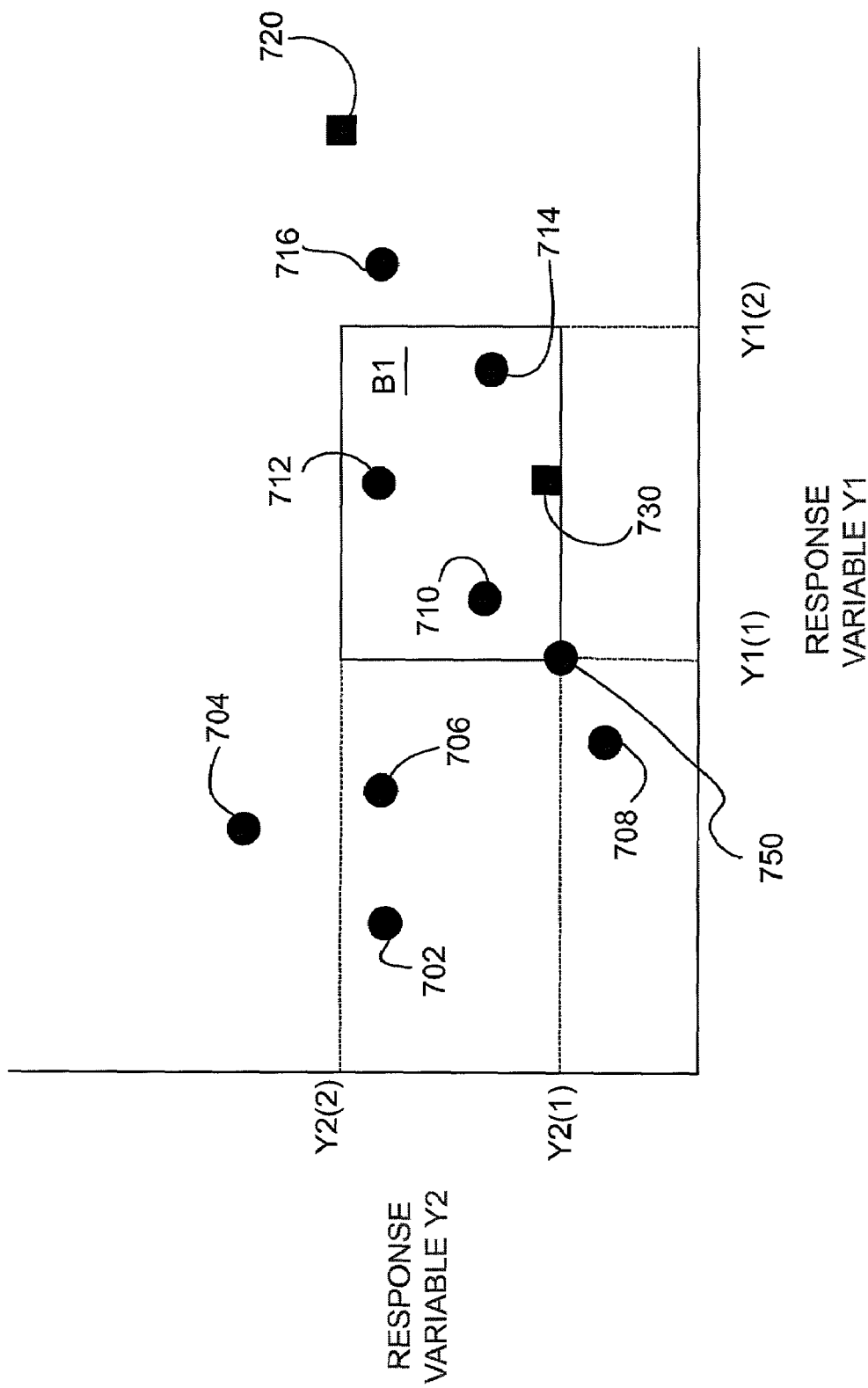
FIG. 7 illustrates an exemplary desired design space consistent with certain principles related to the present invention.

For example, as shown in FIG. 7, a target system may respond to test control variables X1 and X2 to produce response variables Y1 and Y2 represented by points 702–716. Following the control process consistent with certain features related to the present invention, a system of models reflecting the relationship between the data points 702–716 may be generated by relationship mapping module 220 as previously described. Once generated, the models may be tested. In this aspect of the present invention, system 200 may define a desired response region, which is shown in FIG. 7 as the box B1 bounded by the region of $Y1(1) \leq Y1 \leq Y1(2)$ and $Y2(1) \leq Y2 \leq Y2(2)$. One skilled in the art would recognize that the response variables associated with the target system may not be constrained. Alternatively, the response variables may be constrained if they become potentially damaging to the target system. For example, if a design constraint associated with a response variable (e.g., Y1) requires that its value not exceed a predetermined value, the response variable Y1 may be constrained.

In this aspect of the present invention, system 200 may be configured to concentrate on improving the accuracy of the model within the desired response region B1 and ignore the relationships of the model that fall outside B1. Accordingly, system 200 may be configured to test the model using control variables that produce response variables within desired response region B1.

The four corners of the desired response region B1 may be identified by system 200 by manipulating the models to provide control variables X1 and X2 that produce response variables that may fall on the four corners of B1 defined by the coordinates (Y1(1), Y2(1)), (Y1(2), Y2(1)), (Y1(1), Y2(2)), and (Y1(2), Y2(2)). Accordingly, based on the system of models produced by the relationship mapped within the desired response region, the predicted response variables may be determined. For example, based on the models, when control variable X1=10 and control variable X2=20 are applied to the target system, the models generated by system 200 predicts that Y1 is Y1(1) and Y2 is predicted to be Y2(1), as shown by data point 750. When the control variables X1=10 and X2=20 are actually applied to the target system, however, an actual response may result in data point 720, which is outside desired response region B1. In one aspect of the invention, system 200 may not be concerned with the response variable data point 720 because it is outside the desired response region. When control variables X1=15 and X2=18 are applied to the target system, the response variable data point 730 may be produced, which is within the desired response region B1. Accordingly, system 200 may require that the models be adjusted by training module 240 to better represent the actual response characteristics of the target system.

The above aspect of the present invention may enable system 200 to allow control variables to move within specified ranges in order to achieve desired responses. That is, system 200 may confine desired response regions which may increase the accuracy and responsiveness of the control process as compared to a system that confines control variables. Confining the control variables of a target system may require additional tests to be run to redefine the boundary of a control variable region. Alternatively, constraining the response variables to a desired response region in accordance with certain features related to the present invention may reduce testing time because system 200 is configured to ignore the performance of the model in regions where accuracy is deemed not important (e.g., outside desired response region B1).

System 200 may determine that the predicted response variables are within a predetermined threshold based on different criteria. In one aspect of the invention, the criteria may be associated with the actual response variables of the target system. For example, in one aspect of the present invention, system 200 may determine that a predicted response variable is within an acceptable threshold when it has a value within a predefined range of the corresponding actual response variable. For instance, system 200 may set up a delta value that reflects an acceptable deviation from an actual response variable value. Accordingly, if the delta value for a certain set of control variable values (e.g., X1=10 and X2=150) is set at plus or minus 2.0 and a predicted value for response variable Y1 is determined to be 10 while the actual response variable is 11, system 200 may determine that the predicted response variable is acceptable. One skilled in the art would recognize that system 200 may implement a number of different techniques, algorithms, and/or processes for determining whether a predicted response variable is acceptable without departing from the spirit and scope of the present invention.

Referring to FIG. 3, in the event system 200 determines that one or more of the predicted response variables are not within a predetermined threshold (Step 340; NO), training module 240 may be employed to adjust the model to improve its accuracy. In one aspect consistent with certain features related to the present invention, system 200 may perform a sequential testing process that allows the model to be adjusted to allow the operation of the target system to converge toward one or more target response variable values (e.g., desired response variable values).

In one aspect of the present invention, system 200 may determine a target response variable that the control process is attempting to monitor. For example, if system 200 determined that the target system should attempt to minimize the value of Y1, while considering all of the constraints defined by data collection module 210, Y1 may be considered a target response variable. Although one skilled in the art would recognize that there may be more than one response variable that is being monitored, for explanatory purposes, the description of the sequential testing process is described with respect to a single target response variable.

Figure 8:
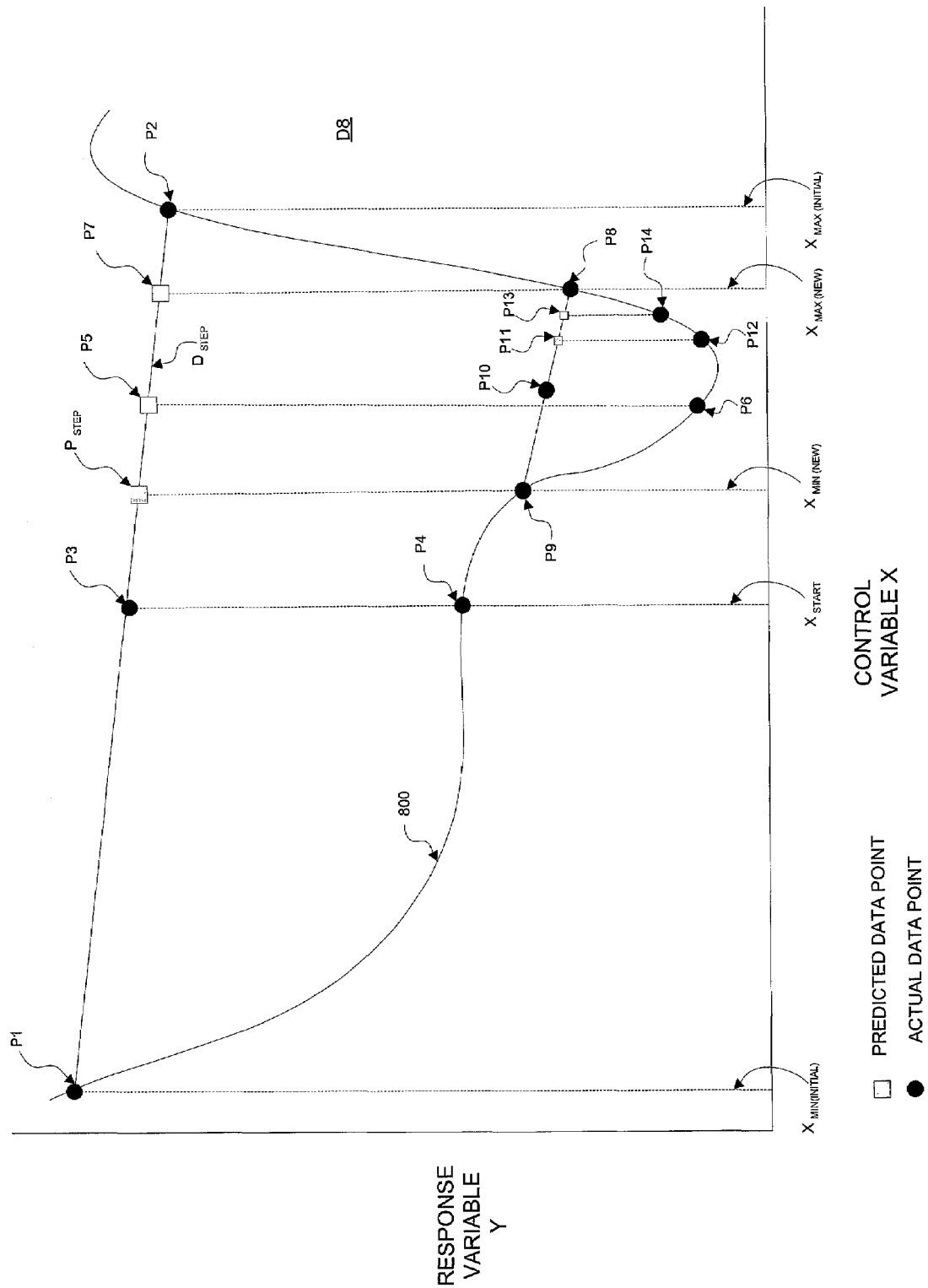
FIG. 8 illustrates another exemplary model reflecting a relationship between a control and response variable consistent with certain principles related to the present invention.

In one aspect of the invention, training module 240 may select the minimum and maximum values for the control variables (e.g., X1(Min)=10 and X1(Max)=100) that correlate to the models that reflect the relationship between the control variables and response variables. For example, FIG. 8 shows a representation of an exemplary model that reflects the relationships between a control variable X and a response variable Y within a design space D8. The minimum and maximum range values for control variable X may have been previously determined by data collection module 210 and correlated to the relationship function between response variable Y and control variable X. Data point P1 and data point P2 may represent the extreme values (minimum and maximum range values) for control variable X, shown as $X_{min(initial)}$ and $X\ Max_{(initial)}$. Training module 240 may designate data point P1 as an initial data point and data point P2 as a target point for the control process consistent with the present invention. Therefore, the control variable data values corresponding to data points P1 and P2 represent actual data values that may be applied to the target system to produce respective response variables. Although the control process is described with data point P2 designated as the target point, embodiments of the present invention are not limited to such designations. For example, if the slope of the line interconnecting data points P1 and P2 was reversed (e.g., P1 having a lower response variable data value than data point P2), data point P1 (e.g., $X_{Min(Initial)}$) would be the target data point. Further, the function 800 depicted in FIG. 8 is exemplary and not intended to limit the present invention. For example, response variable (Y) may be a function of a plurality of responses. Thus, function 800 may be represented by a quadratic function that reflects a parabola with the target data point located in the middle of the function and not at the extreme ends of the function, as shown by data points P1 and P2 in FIG. 8. Therefore, the control process may be performed to determine a target data point (e.g., the minimum of control variable Y) that may be determined by a current model and is located between two control variable threshold values $X_{Min}$ and $X_{Max}$.

Once these two points are identified, training module 240 may determine an actual midpoint data value P3 between the target and initial data points (P1 and P2) and map this midpoint to the model reflected by the function 800 (Step 345). To map data point P3 to function 800, training module 240 may apply the control variable data value corresponding to data point P3 ($X_{start}$) to the target system to produce an actual response variable. Data point P4 reflects the actual response variable that is mapped to function 800 and data point P3 represents a starting point for the control process.

Once system 200 has mapped the midpoint to the function, training module 240 may take a step toward the target data point P2, which in one embodiment of the invention is a distance equivalent to half-way between data points P3 and P2. Accordingly, training module 240 determines a predicted data point P5 and maps this data point to function 800 to determine data point P6. Once data point P6 is mapped to function 800, training module 240 may then determine whether the mapped data point P6 is closer to a desired value (Step 350), which in this example may be to minimize response variable Y1 between the range values of $X_{min(initial)}$ and $X_{Max(initial)}$. Accordingly, training module 240 may determine whether the response variable data value for data point P6 is less than the data value associated with mapped data point P4. As shown in FIG. 8, the exemplary data point P6 is lower than P4, thus training module 240 may allow the sequential testing process to take another step toward the target value represented by data point P2 (Step 355).

Accordingly, training module 240 may determine a predicted data point half way between predicted data point P5 and the target data point P2, shown in FIG. 8 as predicted data point P7. This predicted data point (e.g., P7) is then mapped to function 800 as data point P8. Training module 240 may then repeat Step 350 to determine whether the response variable data value corresponding to data point P8 is lower than the response variable data value for data point P6. In this example, data point P8 is greater than data point P6 (Step 350; NO). Accordingly, training module 240 may modify the design space by re-centering the space around data point P5 and the last good data point on function 800, which in this example is data point P6.

To re-center the design space, training module 240 may determine the size of the step that was taken from data points P5 and P6 to predict data point P7, shown in FIG. 8 as $D_{step}$. Training module 240 may then step back from data point P5 the same distance (e.g., $D_{step}$) to determine predicted data point $P_{step}$ and map this data point to function 800, shown as data point P9. Thus, training module may apply the control variable data value corresponding to data point $P_{step}$ to the target system to produce a response variable data value (e.g., data point P9) corresponding to the control variable data value. Training module 240 may then designate a new range of data values for the design space bounded by data point P9, which is a new minimum control variable data value $X_{min(new)}$ and data point P8, which is a new maximum control variable data value $X_{max(new)}$.

Training module 240 may then repeat the control process at Step 320. In other words, system 200 may return to Step 320 in the control process to create a new model based on the modified design space, determine whether new predicted response variables created by the new model are within the predetermined threshold, and if not, adjust the model as described with respect to Steps 340–360. Therefore, training module 240 determines whether the response variable data values associated with data point P9 is within a threshold (Step 340), and if not, determines an actual midpoint data value P10 between the new minimum and maximum data values P9 and P8. Training module 240 may then take a step towards the new target data point P8, reflected as predicted data point P11 in FIG. 8, and maps this data point to function 800 to determine data point P12. Training module 240 then determines whether data point P12 is closer to an enhanced data value (e.g., is data point P12 lower than the last good data point P6?) (Step 350). In this example, data point P12 is lower than data point P6 (Step 350; YES), so training module 240 may take another step towards the new target point P8, reflected by predicted data point P13. This new predicted data point (e.g., P13) is then mapped to function 800 to determine data point P14, and the control process returns to Step 350. In this example, because data point P14 is larger than the last mapped data point P12 (Step 350; NO), training module may then modify the design space as previously described with respect to Step 360.

In one embodiment of the present invention, when system 200 determines that the predicted response variables are within the predetermined threshold (Step 340; YES), the values of the control and response variables may be collected and stored in memory 250 (Step 365). Therefore, in the above exemplary control process, data point P12 may be determined to be within an acceptable threshold (e.g., minimum Y) and collect and store the corresponding control and response variable data values in memory 250. One skilled in the art would recognize that the variables may be stored in other memory devices associated with any of the modules included in system 200, including modules not shown. The stored variable information may be used by system 200 to control the performance of the target system while attempting to meet predetermined design goals associated with the response variables.

Figure 9:
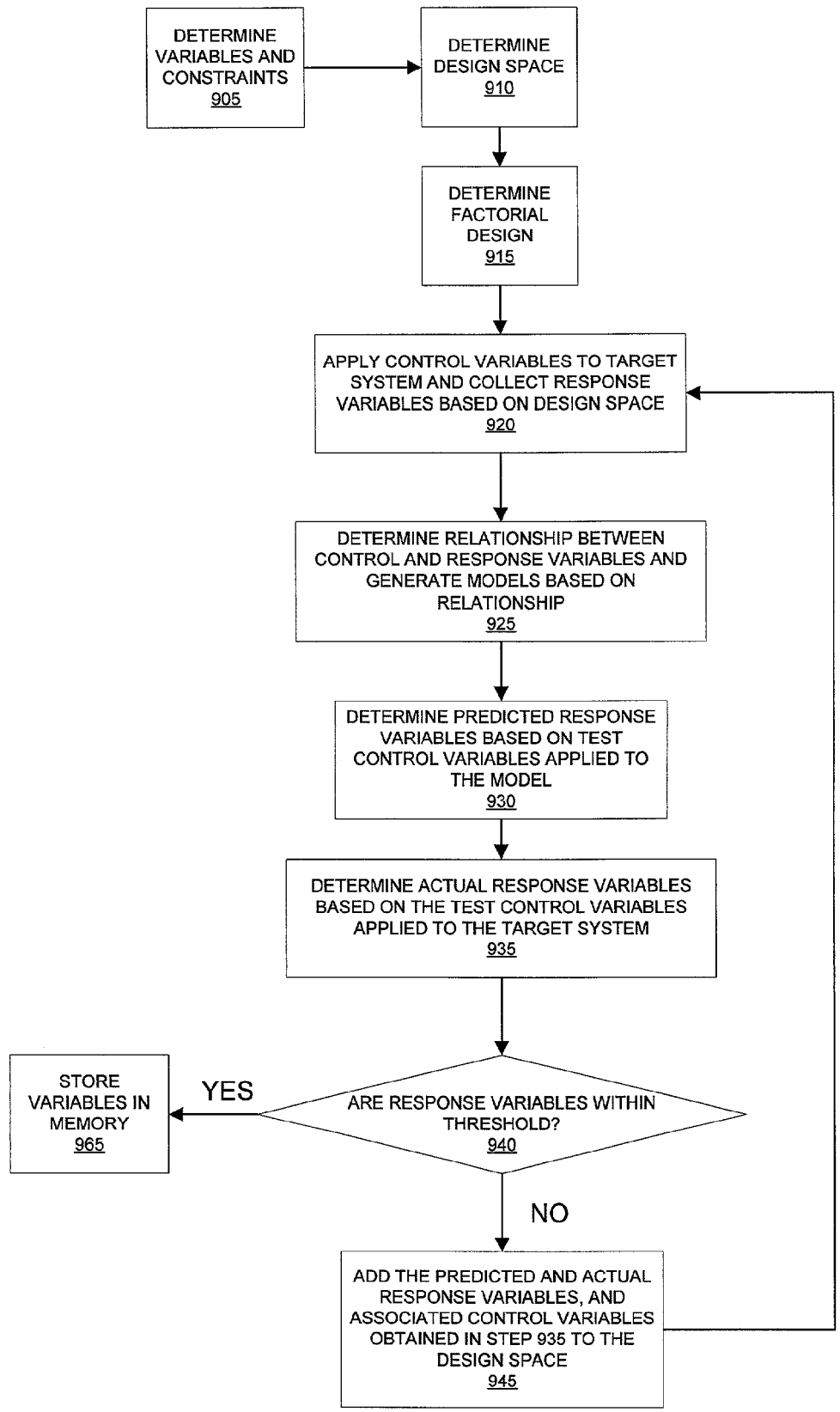
FIG. 9 illustrates a flowchart of another exemplary control process consistent with certain principles related to the present invention.

In one aspect of the invention, instead of performing a sequential testing process, system 200 may perform an adaptive learning process to adjust the model of the target system's operations. In this aspect of the present invention, the control process may be adjusted as shown in FIG. 9. As shown, system 200 may perform the same procedures as described above with respect to FIG. 3 until adjustment of the model is necessary. That is, system 200 may perform steps 905–940 in the same manner that steps 305–340 are performed in the control process shown in FIG. 3.

In the event system 200 determines that the predicted response variables are not within a predetermined threshold (Step 940; NO) the actual response variables and their corresponding control variables are added to the design space previously determined by data collection module 210 (Step 945), the control process may then remap the model to determine an updated relationship between the control and response variables in the existing or new design space. The process repeats until the predicted response variables are determined to be within the predetermined threshold (Step 940; YES) where the enhanced variables (e.g., control and corresponding control variables) are stored in memory 250 or any other suitable storage device (Step 965). The stored variable information may be used by system 200 to control the performance of the target system. Accordingly, certain embodiments of the present invention, the adaptive learning process may use a fixed design space and refine models reflecting relationships between control and response variable as subsequent sets of control variables are applied to the target system. For example, the adaptive learning process may start from a base of information, which may be an accumulation of points obtained from the control process described above or the result of other types of designed experiments. Using the base of information, control variables that are deemed to produce enhanced responses based on a current model reflecting the relationships between control and response variables may be applied to the target system to produce actual response data. If the actual response data exceeds a predetermined error threshold associated with predicted response data, the actual and predicted response data, along with the applied control variable data is added to the base of information and the modeling/prediction process is repeated until the error threshold is not exceed.

As described, methods, systems, and articles of manufacture consistent with certain principles related to the present invention may allow a process control system to control the performance of a target system in a steady state environment. That is, an environment wherein certain operating conditions associated with the target system remain unchanged for a period of time. In accordance with another aspect of the present invention, system 200 may also be configured to control the performance of the target system during transient operating conditions. That is, operating conditions that allow one or more operating parameters associated with the target system to dynamically change with respect to time. For example, FIG. 10 shows an graph reflecting the dynamic nature of two operating parameters of an exemplary target system.

In accordance with one aspect of the invention, system 200 may maintain a parameter map that reflects a relationship of predetermined control variables associated with a target system to one or more operating parameters associated with the target system. For example, the parameter map may be a lookup table that is stored in memory 250 and includes control variable values at each cell of the table, with the rows and columns of the table reflecting a first and second parameter, respectively. That is, the lookup table may include a relationship of a parameter 1 and a parameter 2 with, for example, a control variable X1. Accordingly, as a parameter changes (e.g., parameter 1), the lookup table may be used to determine a new value of the control variable. If needed, system 200 may use interpolation processes to determine an appropriate value between two values within a given row or column of the table.

One skilled in the art would recognize that any number of combinations of parameters and control variables may be implemented by system 200 and represented in a map without departing from the scope of the present invention. For example, each value in a cell of the lookup table may reflect a plurality of control variables with certain individual values. Thus, the information found in a cell within the table located at, for example, the intersection of Parameter 1=5 and parameter 2=100, may reflect two control variable values X1=20 and X2=77. Further, system 200 is not limited to the use of a lookup table for maintaining a mapped relationship between the parameters 1 and 2 and predetermined control variables. Other types of storage architectures may be implemented by system 200 without departing from the scope of the invention.

Figure 10:
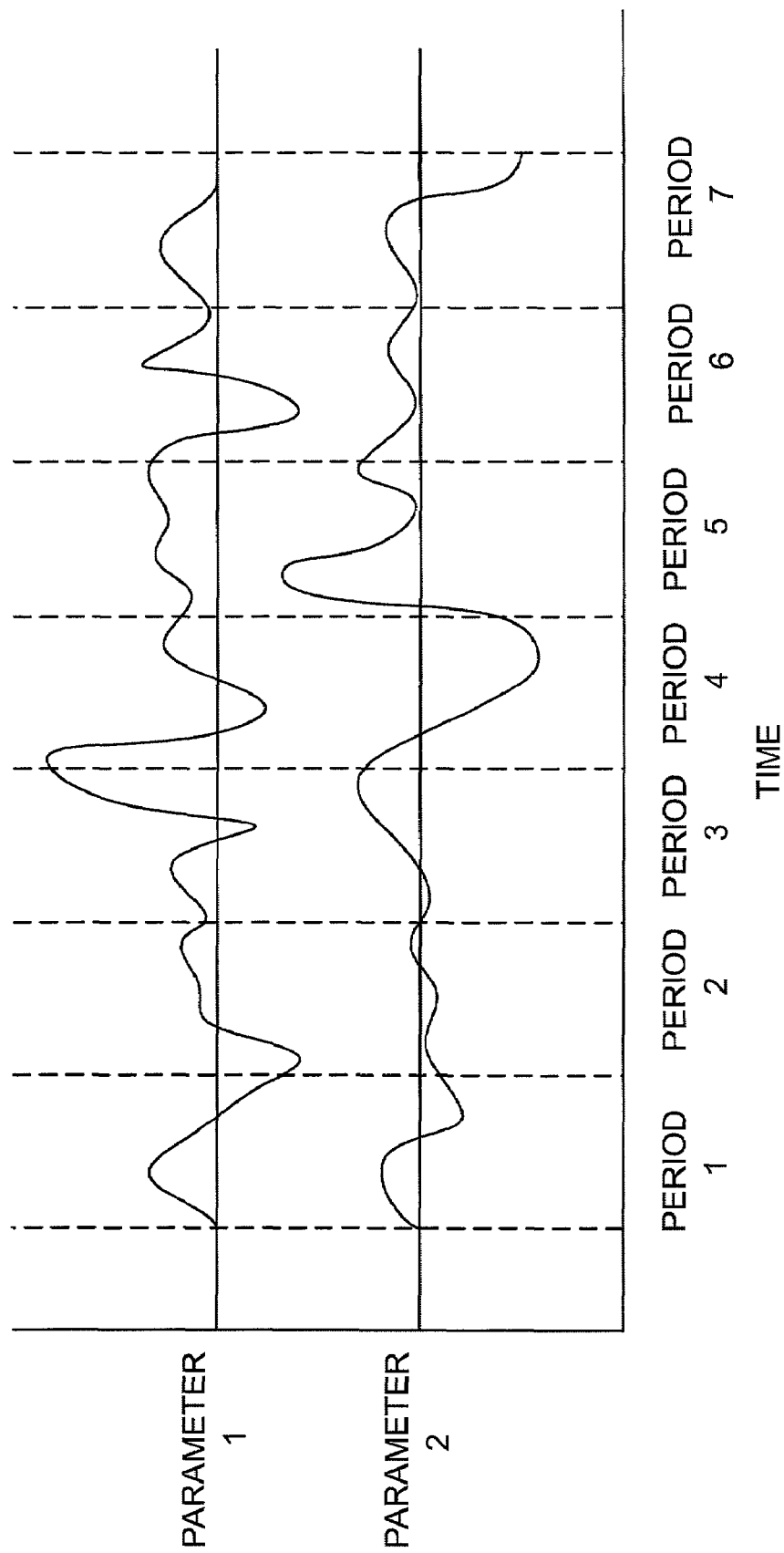
FIG. 10 illustrates a graph of the transient operation of a target system with respect to two exemplary parameters consistent with certain principles related to the present invention.
Figure 11:
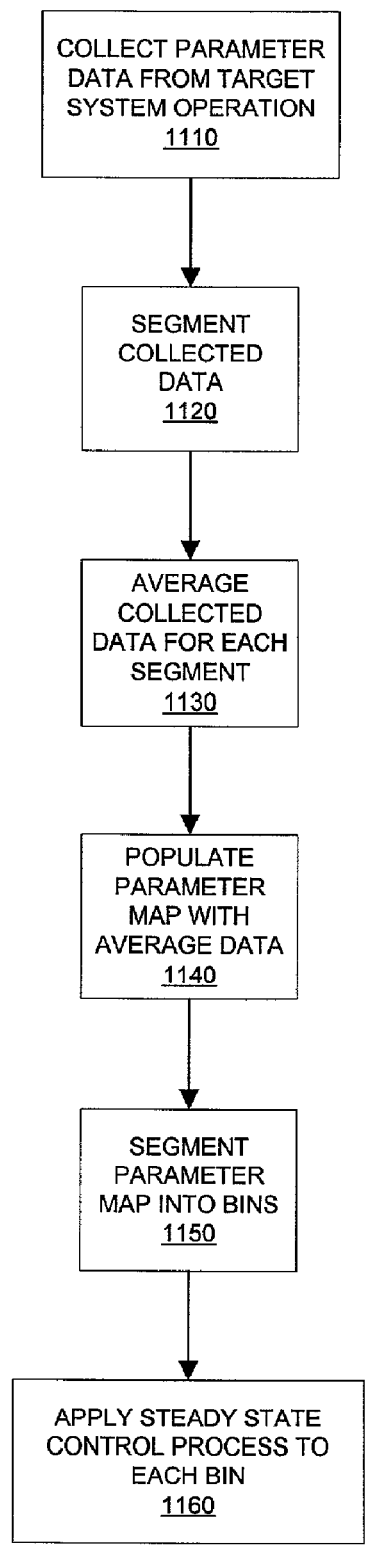
FIG. 11 illustrates a flowchart of another transient control process consistent with certain principles related to the present invention.

As shown in FIG. 10, the values of the two exemplary parameters dynamically change over time. To control these types of dynamic environments, methods, systems, and articles of manufacture consistent with certain features related to the present invention may perform a transient control process that characterizes the operation of the target system as segmented steady state conditions. FIG. 11 shows a flowchart of an exemplary transient control process consistent with certain features related to the present invention.

As shown in FIG. 11, the transient control process that may be performed by system 200 may begin by data collection module 210 collecting data associated with one or more predetermined parameters associated with the operations of the target system (Step 1110). As previously described, FIG. 10 shows parameter data that may have been collected from an exemplary target system over a period of time (t). Next, system 200 may separate the collected parameter data into segments across the period of time (t). For example, FIG. 10 shows the collected parameter information segmented into seven periods (segments). One skilled in the art would recognize that system 200 may separate the collected parameter information into equal sized segments, or into segments of various sizes. For example, periods 1–7 shown in FIG. 10 may reflect time periods of 0–2, 2–4, 4–6, 6–8, 8–10, 10–12, and 12–14 seconds, respectively.

Once the collected parameter data is segmented, system 200 may determine the average values for each parameter for each segment (Step 1130). For example, referring to FIG. 10, the average values of parameters 1 and 2 during each period 1–7 may be determined. In one aspect of the present invention, the average parameter data may be stored in memory 250, or other similar memory device as an array, file, table, etc., correlating each period with their corresponding average parameter values. Next, system 200 may populate the parameter map previously maintained by system 200 with the average parameter data (Step 1140). Therefore, the parameter map may now include the average parameter information associated with the transient operations of the target system.

Figure 12:
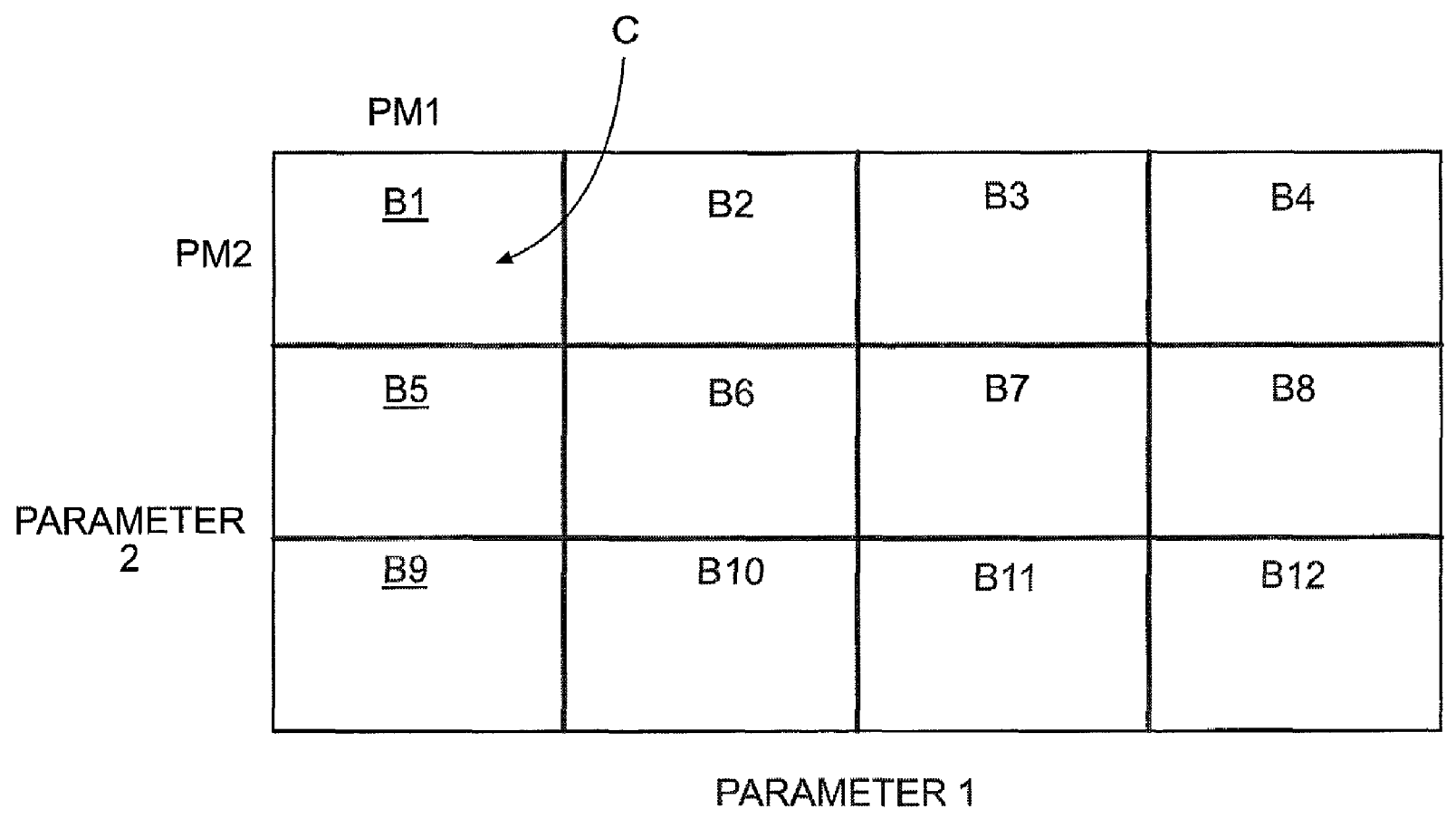

System 200 may then separate the parameter map into individual segments, or "bins" (Step 1150). The bins may or may not be equal sized. FIG. 12 shows a parameter map separated into bins B1–B12. Each cell in the parameter map, such as cell C, may reflect one or more control variables associated with the target system. For example, cell C may include a value of a control variable X1 that was applied to the target system when parameter 1 had a value of PM1 and parameter 2 had a value of PM2. In one aspect of the invention, each bin may include the average value of a number of average segments. For example, if the average parameter values of first and second average segments are PM1, 1=12.5, PM2, 1=125, PM3, 1=10, PM1, 2=14, PM2, 2=100, PM3, 2=20, and B1 is bounded by PM1=0, 20 and PM2=0, 150, then both PM3 values belong to bin B1 and are averaged to result in a B1 value of PM3=15.

Once segmented into bins, the parameter map may be used by system 200 to control the performance of the target system. In one aspect of the present invention, system 200 may perform the steady-state control process described with respect to FIGS. 3 or 9 for each bin (Step 1160). For example, the control variable information for bin B1 may be used by data collection module 210 to determine a design space and factorial design. In one aspect of the invention, each bin's average parameter value is altered via the steady state control process.

The control variables may be applied to the target system to retrieve response variables for forming a model reflecting the relationship between the control and response variables. The model may be tested (e.g., analyze actual response variables against predicted response variables) and the model may be adjusted based on whether the predicted response variables are within a predetermined threshold. System 200 may perform the sequential testing, the adaptive learning processes, or both when adjusting the model. Once bin B1 has been, system 200 may process subsequent bins, such as bin B2, then B3, and so forth until every bin in the parameter map has been processed. Alternatively, system 200 may be configured to perform the control processes on each bin simultaneously using parallel processing and multi-tasking processing techniques. One skilled in the art would recognize that the sequence that each bin is processed may vary without departing from the spirit and scope of the present invention. Further, as with the steady state control process, the enhanced variable values may be stored in a memory, such as memory 250, that system 200 may use to control the performance of the target system.

INDUSTRIAL APPLICABILITY

Methods, systems, and articles of manufacture consistent with certain features related to the present invention allow a system to accurately predict response variables based on predetermined control variables. The disclosed invention is useful, for example, in providing a system for controlling the operations of a target system during run time operations to achieve enhanced performance associated with predetermined variables and constraints. Further, the disclosed invention may be applied to processes that may be defined by known relationships between variables associated with the process. For example, certain aspects of the present invention may be applied to a system where one or more relationships are empirical, but certain variables and/or constants are not known.

In one aspect of the present invention, system 200 may be applied to control the operation of an engine associated with any type of equipment, such as vehicles (e.g., land, water, and air-based vehicles) and non-vehicle type equipment (e.g., power tools, plant equipment, etc.) where power of the target system may be controlled. For example, certain aspects of the present invention may be applied to a system that operates an engine that is constrained by certain government regulations, such as those associated with emissions. That is, system 200 may be an engine control unit housed within or near an engine that provides power to a vehicle or non-vehicle type system. In such an application, the target system (e.g., engine) may be tested in multiple modes of operations, with each mode being associated with certain predetermined operating parameters of the engine. For example, a mode may be associated with a particular engine load and engine speed. System 200 may be configured to determine a performance curve that is based on the operating characteristics of the engine through different modes of operations, each mode reflecting a particular engine speed and load associated with a corresponding set of predetermined control variables.

Further, system 200 may be configured to perform the control processes consistent with certain features related to the present invention to develop a map or table of control and response variables for controlling a engine. That is, the enhanced values stored in memory 250 may be used by system 200 to determine the appropriate control variables that need to be delivered to the engine to obtain certain response variables. The response variables in the map may be predicted response variables obtained from a model generated by system 200 under a particular load and/or speed (i.e., mode). Accordingly, during runtime operations, system 200 may sense the speed and load of the engine using virtual or hardware based sensors. The sensed speed and load values may be used to access the variable map to determine what control variables are needed to provide certain response variables. System 200 may then apply the determined control variables to the engine, either directly or indirectly.

In another aspect of the present invention, system 200 may be configured to apply the transient control process to the same types of target systems as described above. For example, the parameters shown in FIG. 10 may reflect the engine speed and load of the exemplary engine system described above. Accordingly, system 200 may configure the parameter map to reflect certain control variables associated with the exemplary engine based on the engine speed and load data collected during transient operations. Further, the bins included in the segmented parameter map (e.g., bins B1–B12 shown in FIG. 12) may be associated with a mode as previously described. Accordingly, system 200 may perform the control processes described in FIGS. 3 or 9, for each mode or bin, to create a variable map. As with the steady state example described above, the variable map may be used by system 200 to determine what control variables to apply to the exemplary engine in order to achieve certain response variables.

In yet another aspect of the present invention, system 200 may create a lookup table for different modes of operation associated with the target system. System 200 may be configured to receive various performance goals associated with the target system. These performance goals may be associated with an individual mode of operation, with associated constraints, control variables, and response variables. Alternatively, or additionally, the performance goals may be associated with the overall performance of the target system. That is, the performance of the target system including all of the modes of operations and their constraints. Accordingly, the operation of each mode may affect the operation of another mode, as well as the performance of the overall system. For example, system 200 may be configured with a target system performance goal of achieving a certain value for one response variable while not exceeding any constraints associated with any control variables, response variables, and/or modes of operation. Therefore, system 200 may be configured to determine or receive system level constraints that ensure the target system meets an overall system level of performance.

For example, consider an environment that includes three modes of operations with each mode associated with two parameters and a single response variable. Further, each mode may include a weight value that is applied to the response variable based on a predetermined priority associated with the mode. System 200 may determine that the target system may operate in mode 1 for 10% of the operating cycle time, in mode 2 for 20% of the time, and in mode 3 for the remaining 70% of the cycle time. Accordingly, the overall system performance associated with the response variable may be reflected by the sum of the values for the response variable multiplied by the weight value for each mode. In one aspect of the invention, there may be a constraint value on not only the overall performance of the system level response variable value, but constraints for each mode of operation. Thus, system 200 may be configured to perform the control processes consistent with certain aspects of the present invention to not only operate within the overall system constraints, but also within each constraint for a given mode of operation.

In one aspect of the present invention, system 200 may achieve the above described performance goals by trading off certain aspects between modes. For example, to achieve an improvement in one response variable may require a set back in another response variable (e.g., improved emissions for an engine may result in reduced fuel economy). System 200 may, however, recognize that the target system is more concerned with certain response variable goals during certain modes of operation, without exceeding any assigned constraint. For example, when target system operates in mode 3, fuel economy may be of greater importance than emissions. Alternatively, since the target system may only operate in mode 1 for 10% of the time, fuel economy may not be a concern to the target system during this mode of operation.

To control the performance of the target system based on the tradeoffs between modes, system 200 may create second tier relationship models based on previously created models for each mode of operation. The generated second tier models may reflect an overall performance relationship that takes into consideration all modes of operation (i.e., all the models created during the control process for each mode). System 200 may create a second tier lookup table that includes a relationship between the parameters for the modes of operation and the control and response variables associated with the target system's overall performance. Therefore, system 200 may use the second tier lookup table to apply certain control variables to the target system based on detected parameter values to achieve a desired overall response variable. The second tier models may allow system 200 to recognize when a tradeoff may be applied during runtime operations of the target system, thus detrimentally reducing the performance of one response variable for the benefit of another response variable based on a particular mode of operation the target system is performing.

Although certain aspects of the present invention have been described based on either the sequential testing and adaptive learning processes, in another aspect of the invention, the present invention may combine the sequential testing and adaptive learning processes. This combination may be applied by system 200 in order to compliment the control process performed by system 200. For example, the control process described with respect to FIG. 3 may be modified to include an adaptive learning process that performs a redundancy check on the control values determined by the sequential testing process. That is, system 200 may be configured to test the response variables and corresponding control variables that were determined to be within a predetermined threshold of the actual response variables using the adaptive learning process. System 200 may apply the stored control and response variables to the design space determined by data collection module 210 and remap the model to determine a new relationship between the variables. The model may then be tested against the actual response variables to determine whether the adaptive learning process produces accurate predictive response variables that are similar to those variables determined by the sequential testing process. Alternatively, the adaptive learning process may fine tune the model to produce predictive response variables that are even closer to the threshold used by the sequential testing process. For example, if the sequential testing process had a threshold value of ±5, the adaptive learning process may fine tune the model to produce predictive response variables within a value of 2 of the actual response variables.

Further, the types of modes of operation that a target system is operated may affect the type of control process to apply. For example, system 200 may apply a sequential control process for single mode operations that may be approached with linear models. Further, system 200 may apply the adaptive learning control process for multiple mode operations, where more sophisticated models may be required to process the varying ranges of variables associated with multiple mode operations. Therefore, in one embodiment of the invention, the sequential control process may be used by system 200 to collect a pool of data for each of a plurality of specific modes of operation. The collected pool of data may then be used by system 200 as a starting point for the adaptive control process on a global scale (e.g., multiple modes of operations).

As previously described, methods, systems, and articles of manufacture consistent with certain principles related to the present invention may be applied with any type of target system. Accordingly, the type of control and response variables, as well as constraints, may vary based on the type of target system. For example, the target system may be a process system that receive control signals that manipulate the operations and performance of the process system and produces response variables based on the received control signals. For instance, the process system may be a manufacturing device operating in a manufacturing plant, a household or industry-based system, such as an air conditioning/heating system, autonomous sensor-based systems, such as security systems, lighting systems, irrigation systems, etc. Further, embodiments of the present invention may be applied to sub-components of an engine-based target system. For example, the target system may be a support systems for an aircraft, water-based, or land-based vehicle, such as navigation systems. The above exemplary list of applications is not intended to be exhaustive and one skilled in the art would recognize that embodiments of the present invention may be applied to any type of target system that may produce response signals based on selected control signals.

The features, aspects and principles of the present invention may be implemented in various environments. Such environments and related applications may be specially constructed for performing the various processes and operations of the invention. The processes disclosed herein are not inherently related to any particular system, and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling a target system, comprising:
   determining a design space including a first set of control data values associated with a set of control variables;
   generating a model reflecting a relationship between the first set of control data values and a first set of response data values associated with a set of response variables;
   testing the model to determine whether a set of predicted response data values associated with the set of response variables meet a predetermined criteria based on a corresponding set of actual response data values associated with the set of response variables;
   modifying, when the predetermined criteria is not met, the design space to obtain a relationship between a second set of control data values associated with the set of control variables and a second set of response data values associated with the set of response variables; and
   applying the second set of control data values to the target system.

2. The method of claim 1, wherein testing the model includes:
   applying the first set of control data values to the model to obtain the set of predicted response data values; and
   applying the first set of control data values to the target system to obtain the set of actual response data values.

3. The method of claim 1, wherein generating a model includes:
   applying the first set of control data values to the target system to obtain the first set of response data values.

4. The method of claim 1, wherein the model includes a mathematical function and modifying the design space includes:
   designating an initial data point and a target data point on the function based on minimum and maximum values associated with the set of control variables, respectively;
   mapping, to the function, a midpoint between the initial and target data points;
   determining whether the mapped midpoint is converging toward a desired value associated with the at least one response variable;
   stepping toward the target data point when the mapped midpoint is determined to converge toward a desired value associated with the at least one response variable;
   mapping a new midpoint to the function based on the stepping and repeating the determining and stepping steps until the mapped new midpoint diverges from the desired value;
   stepping back from the midpoint to determine a stepped data point between the midpoint and the initial data point when the mapped new midpoint is determined to diverge from the desired value;
   mapping the stepped data point to the function;
   modifying the design space such that the mapped stepped data point is designated as the initial data point and the mapped new midpoint is designated as the target data point; and
   generating a new model based on the modified design space.

5. The method of claim 4, wherein generating a new model includes:
generating a new model based on the modified design space to obtain the relationship between the second set of control data values and the second set of response data values.

6. The method of claim 4, wherein generating a new model includes:
repeating the generating, testing, and modifying the design space until the set of predicted response data values meet the predetermined criteria.

7. The method of claim 1, wherein the target system is associated with an engine and each control variable is an independent variable that may control operations of the engine.

8. The method of claim 7, wherein each response variable is a dependent variable associated with a response characteristic of the engine and may change values based on the set of control variables.

9. The method of claim 1, wherein the method for controlling target system is performed for a plurality of modes of operations, wherein each mode of operation is associated with at least one parameter that remains constant.

10. The method of claim 1, wherein generating a model includes:
determining a first mathematical function that accurately represents a first relationship between a group of control data values corresponding to the set of control variables and a group of response data values corresponding to the set of response variables;
determining a second mathematical function that accurately represents a second relationship between a second group of control data values corresponding to the set of control variables and a second group of response data values corresponding to the set of response variables; and
generating the model based on the first and second relationships.

11. The method of claim 1, wherein the predetermined criteria is a threshold value associated with a relationship between the set of predicted response data values and the set of actual response data values.

12. The method of claim 11, wherein the set of predicted response data values is determined to meet the predetermined criteria when at least one predicted response data value is within the threshold value of a corresponding at least one actual response data value.

13. The method of claim 1, wherein modifying the design space includes:
modifying the data values of at least one of the control data values associated with the set of control variables.

14. A computer implemented method configured to control a target system, comprising:
generating a model reflecting a relationship between at least one control variable and at least one response variable, wherein the relationship is represented as a mathematical function included in a design space bounded by a minimum and maximum value associated with the at least one control variable;
designating an initial data point and a target data point on the function based on the minimum and maximum values, respectively;
mapping, to the function, a midpoint between the initial and target data points;
determining whether the mapped midpoint is converging toward a desired value associated with the at least one response variable;
designating the mapped midpoint value as the initial data point on the function;
repeating the mapping and determining until the mapped midpoint diverges from the desired value;
modifying the design space such that a last midpoint that converged toward the desired value is designated as the initial data point; and
generating a new model based on the modified design space.

15. A method for controlling a target system, comprising:
creating a parameter map including a relationship between a set of parameters and a set of control variables associated with the target system;
collecting parameter data for each parameter in the parameter set reflecting a dynamic operation of the target system, wherein the parameter data varies as a function of time;
separating the collected parameter data into temporal based segments;
determining an average value of each parameter included in each segment;
populating the parameter map with the average values of each parameter;
segmenting the parameter map into bins; and
for each bin,
generating a model reflecting a relationship between the set of control variables and a set of response variables associated with an operation of the target system based on the average value for each parameter corresponding to the bin;
determining a set of predicted response data values associated with the set of response variables based on the model,
adjusting the model until the predicted response data values meet a predetermined criteria, and
determining a set of control data values corresponding to the set of control variables that are associated with the predicted response variables that meet the predetermined criteria.

16. The method of claim 15, wherein generating a model includes:
applying the set of control variables to the target system to obtain the set of response variables; and
determining one or more mathematical functions that accurately represent the relationship between the set of control variables and the set of response variables.

17. The method of claim 16, wherein determining one or more mathematical functions includes:
determining a first mathematical function that accurately represents a first relationship between a first set of data values corresponding to the set of control variables and a first set of data values corresponding to the set of response variables;
determining a second mathematical function that accurately represents a second relationship between a second set of data values corresponding to the set of control variables and a second set of data values corresponding to the set of response variables; and
generating the model based on the first and second relationships.

18. A method for controlling a target system, comprising:
determining a base of information including a first set of control data values associated with a set of control variables;
generating a model reflecting a relationship between the first set of control data values and a first set of response data values associated with a set of response variables;

testing the model to determine whether a set of predicted response data values associated with the set of control variables meet a predetermined criteria based on a set of actual response data values associated with the set of response variables;

adding the set of predicted response data values and the set of actual response data values to the base of information when the set of predicted response data values does not meet the predetermined criteria;

repeating the generating, testing, and adding until the set of predicted response data values meets the predetermined criteria;

determining a second set of control data values associated with the set of control variables that, when applied to the target system, will produce a second set of response data values associated with the set of response variables based on the repeating; and applying the second set of control data values to the target system.

19. A system configured to control the performance of a target system, comprising:
    a data collection module for determining a design space including a first set of control data values corresponding to a set of control variables;
    a relationship mapping module for generating a model reflecting a relationship between the first set of control data values and a first set of response data values corresponding to a set of response variables;
    a testing module for testing the model to determine whether a set of predicted response data values associated with the set of response variables meets a predetermined criteria based on a set of actual response data values associated with the set of response variables; and
    a training module for modifying the design space to obtain a relationship between a second set of control data values corresponding to the set of control variables and a second set of response data values corresponding to the set of response variables,
    wherein the system applies the second set of control data values corresponding to the set of control variables to the target system.

20. The system of claim 19, wherein the testing module is further configured to apply the first set of control data values to the model to obtain the set of predicted response data values and apply the first set of control data values to the target system to obtain the set of actual response data values.

21. The system of claim 19, wherein the relationship mapping module is further configured to apply the first set of control data values to the target system to obtain the first set of response data values.

22. The system of claim 19, wherein the model includes a mathematical function and the training module is further configured to:
    designate an initial data point and a target data point on the function based on minimum and maximum values associated with the set of control variables, respectively;
    map, to the function, a midpoint between the initial and target data points;
    determine whether the mapped midpoint is converging toward a desired value associated with the at least one response variable;
    step toward the target data point when the mapped midpoint is determined to converge toward a desired value associated with the at least one response variable;
    map a new midpoint to the function based on the stepping and repeating the determining and stepping steps until the mapped new midpoint diverges from the desired value;
    step back from the midpoint to determine a stepped data point between the midpoint and the initial data point when the mapped new midpoint is determined to diverge from the desired value;
    map the stepped data point to the function; and
    modify the design space such that the mapped stepped data point is designated as the initial data point and the mapped new midpoint is designated as the target data point,
    wherein the system generates a new model based on the modified design space.

23. The system of claim 22, wherein the system generates a new model by the relationship mapping module repeating its generating functions, the testing module repeating its testing functions, and the training module repeating its modifying functions until the at least one predicted response variable meets the predetermined criteria.

24. The system of claim 19, wherein the target system is associated with an engine and each control variable is an independent variable that may control operations of the engine.

25. The system of claim 24, wherein each response variable is a dependent variable associated with a response characteristic of the engine and may change values based on the set of control variables.

26. The system of claim 19, wherein the system is an engine control unit and the second set of control data values are stored in a memory device associated with the engine control unit.

27. The system of claim 19, wherein the system is configured to control the performance of the target system operating in a plurality of modes of operations, wherein each mode of operation is associated with at least one target system parameter that remains constant during operation.

28. The system of claim 19, wherein the relationship mapping module is further configured to:
    determine a first mathematical function that accurately represents a first relationship between a group of control data values corresponding to the set of control variables and a group of response data values corresponding to the set of response variables;
    determine a second mathematical function that accurately represents a second relationship between a second group of control data values corresponding to the set of control variables and a second group of response data values corresponding to the set of response variables; and
    generate the model based on the first and second relationships.

29. The system of claim 19, wherein the predetermined criteria is a threshold value associated with a relationship between the set of predicted response data values and the set of actual response data values.

30. The system of claim 29, wherein the set of predicted response data values is determined to meet the predetermined criteria when at least on predicted response data value is within the threshold value of a corresponding at least one actual response data value.

31. A computer-readable medium including instructions for performing a method, when executed by a processor, for controlling the performance of a target system, the method comprising:

determining a design space including a first set of control data values associated with a set of control variables;

generating a model reflecting a relationship between the first set of control data values and a first set of response data values associated with a set of response variables;

testing the model to determine whether a set of predicted response data values associated with set of response variables meets a predetermined criteria based on a set of actual response data values associated with the set of response variables;

modifying, when the predetermined criteria is not met, the design space to obtain a relationship between a second set of control data values associated with the set of control variables and a second set of response data values associated with the set of response variables; and applying the second set of control data values to the target system.

32. The computer-readable medium of claim 31, wherein testing the model includes:

applying the first set of control data values to the model to obtain the set of predicted response data values; and applying the first set of control data values to the target system to obtain the set of actual response data values.

33. The computer-readable medium of claim 31, wherein generating a model includes:

applying the first set of control data values to the target system to obtain the first set of response data values.

34. The computer-readable medium of claim 31, wherein the model includes a mathematical function and modifying the design space includes:

designating an initial data point and a target data point on the function based on minimum and maximum values associated with the set of control variables, respectively;

mapping, to the function, a midpoint between the initial and target data points;

determining whether the mapped midpoint is converging toward a desired value associated with the at least one response variable;

stepping toward the target data point when the mapped midpoint is determined to converge toward a desired value associated with the at least one response variable;

mapping a new midpoint to the function based on the stepping and repeating the determining and stepping steps until the mapped new midpoint diverges from the desired value;

stepping back from the midpoint to determine a stepped data point between the midpoint and the initial data point when the mapped new midpoint is determined to diverge from the desired value;

mapping the stepped data point to the function;

modifying the design space such that the mapped stepped data point is designated as the initial data point and the mapped new midpoint is designated as the target data point; and generating a new model based on the modified design space.

35. The computer-readable medium of claim 34, wherein generating a new model includes:

generating a new model based on the modified design space to obtain the relationship between the second set of data values and the second set of response data values.

36. The computer-readable medium of claim 34, wherein generating a new model includes:

repeating the generating, testing, and modifying the design space until the set of predicted response data values meets the predetermined criteria.

37. The computer-readable medium of claim 31, wherein the target system is associated with an engine and each control variable is an independent variable that may control operations of the engine.

38. The computer-readable medium of claim 37, wherein each response variable is a dependent variable associated with a response characteristic of the engine and may change values based on the set of control variables.

39. The computer-readable medium of claim 31, wherein the method for controlling the performance of the target system is performed for a plurality of modes of operations, wherein each mode of operation is associated with at least one parameter that remains constant.

40. The computer-readable medium of claim 31, wherein the generating a model includes:

determining a first mathematical function that accurately represents a first relationship between a group of control data values corresponding to the set of control variables and a group of response data values corresponding to the set of response variables;

determining a second mathematical function that accurately represents a second relationship between a second group of control data values corresponding to the set of control variables and a second group of response data values corresponding to the set of response variables; and generating the model based on the first and second relationships.

41. The computer-readable medium of claim 31, wherein the predetermined criteria is a threshold value associated with a relationship between the set of predicted response data values and the set of actual response data values.

42. The computer-readable medium of claim 41, wherein the set of predicted response data values is determined to meet the predetermined criteria when it includes at least one predicted response data value within a threshold value of a corresponding at least one actual response data value.

43. A computer implemented method for controlling the performance of a target system, comprising:

generating a model reflecting a relationship between at least one control variable and at least one response variable, wherein the relationship is represented as a mathematical function included in a design space bounded by a minimum and maximum value associated with the at least one control variable;

designating an initial data point and a target data point on the function based on minimum and maximum values, respectively;

mapping, to the function, a midpoint between the initial and target data points;

determining whether the mapped midpoint is converging toward a desired value associated with the at least one response variable;

stepping toward the target data point when the mapped midpoint is determined to converge toward a desired value associated with the at least one response variable;

mapping a new midpoint to the function based on the stepping and repeating the determining and stepping steps until the mapped new midpoint diverges from the desired value;

stepping back from the midpoint to determine a stepped data point between the midpoint and the initial data point when the mapped new midpoint is determined to diverge from the desired value;

mapping the stepped data point to the function;

modifying the design space such that the mapped stepped data point is designated as the initial data point and the mapped new midpoint is designated as the target data point; and generating a new model based on the modified design space.

44. A computer-readable medium including instructions for performing a method, when executed by a processor, for controlling the performance of a target system, the method comprising:

creating a parameter map including a relationship between a set of parameters and a set of control variables associated with the target system;

collecting parameter data for each parameter in the parameter set reflecting a dynamic operation of the target system, wherein the parameter data varies as a function of time;

separating the collected parameter data into temporal based segments;

determining an average value of each parameter included in each segment;

populating the parameter map with the average values of each parameter;

segmenting the parameter map into bins; and for each bin,
generating a model reflecting a relationship between the set of control variables and a set of response variables associated with an operation of the target system based on the average value for each parameter corresponding to the bin;

determining a set of predicted response data values associated with the set of response variables based on the model, adjusting the model until the predicted response data values meet a predetermined criteria, and determining a group of data values corresponding to the set of control variables that are associated with the predicted response data values that meet the predetermined criteria.

45. The computer-readable medium of claim 44, wherein generating a model includes:

applying the set of control variables to the target system to obtain the set of response variables; and determining one or more mathematical functions that accurately represent the relationship between the set of control variables and the set of response variables.

46. The computer-readable medium of claim 45, wherein determining one or more mathematical functions includes:

determining a first mathematical function that accurately represents a first relationship between a set of control data values corresponding to the set of control variables and a set of response data values corresponding to the set of response variables;

determining a second mathematical function that accurately represents a second relationship between a second set of control data values corresponding to the set of control variables and a second set of response data values corresponding to the set of response variables; and generating the model based on the first and second relationships.

47. A computer-readable medium including instructions for performing a method, when executed by a processor, for controlling the performance of a target system, the method comprising:

determining a design space including a set of control variables each having a range of values;

generating a model reflecting a relationship between the set of control variables and a set of response variables;

testing the model to determine whether a set of predicted response data values associated with the set of response variables meets a predetermined criteria based on a set of actual response data values associated with the set of response variables;

adjusting the design space based on the set of predicted response data values when the set of predicted response data values does not meet the predetermined criteria;

repeating the generating, testing, and adjusting until the set of predicted response data values meet the predetermined criteria;

determining a set of control data values corresponding to the set of control variables that, when applied to the target system, will produce a set of response data values corresponding to the set of response variables based on the repeating; and applying the set of control data values corresponding to the set of control variables to the target system.

48. A method for controlling a target system, comprising:

determining a design space including a first set of control data values associated with a set of control variables;

generating a model reflecting a relationship between the control variables and a set of response variables;

testing the model to determine whether a set of predicted response data value associated with the set of response variables meet a predetermined criteria based on a corresponding set of actual response data values associated with the set of response variables;

modifying the design space to obtain a second relationship between said control variables and said response variables; and applying a second set of control data values associated with said control variables to the target system based on said second relationship.

* * * * *